United States Patent
Nagase et al.

(10) Patent No.: US 9,909,028 B2
(45) Date of Patent: Mar. 6, 2018

(54) LIGNEOUS DECORATIVE DESIGN PART, AND METHOD OF PRODUCING THE SAME

(71) Applicant: KOJIMA INDUSTRIES CORPORATION, Toyota-Shi (JP)

(72) Inventors: Kimihiro Nagase, Toyota (JP); Kozo Kanayama, Nagoya (JP); Tsunehisa Miki, Nagoya (JP); Ichinori Shigematsu, Nagoya (JP); Masako Seki, Nagoya (JP)

(73) Assignee: Kojima Industries Corporation, Toyota-Shi (JP)

( * ) Notice: Subject to any disclaimer, the term of this patent is extended or adjusted under 35 U.S.C. 154(b) by 108 days.

(21) Appl. No.: 14/716,981

(22) Filed: May 20, 2015

(65) Prior Publication Data
US 2015/0343837 A1    Dec. 3, 2015

(30) Foreign Application Priority Data
May 27, 2014   (JP) ................................. 2014-109490

(51) Int. Cl.
*B32B 3/10* (2006.01)
*C09D 161/28* (2006.01)
(Continued)

(52) U.S. Cl.
CPC ............ *C09D 161/28* (2013.01); *B44C 5/043* (2013.01); *B44C 5/06* (2013.01); *B44F 1/06* (2013.01);
(Continued)

(58) Field of Classification Search
None
See application file for complete search history.

(56) References Cited

U.S. PATENT DOCUMENTS

| 2,488,301 A | 11/1949 | Lundstrom | |
| 4,963,214 A * | 10/1990 | Iwata | B32B 27/04 156/154 |
| 6,352,784 B1 * | 3/2002 | Katagiri | B27D 1/00 156/244.11 |

FOREIGN PATENT DOCUMENTS

| CN | 102643499 A | 8/2012 | |
| CN | 103402760 A * | 11/2013 | B44C 5/04 |

(Continued)

OTHER PUBLICATIONS

Machine translation of CN 103402760 Retrieved on Apr. 2, 2017.*
(Continued)

*Primary Examiner* — Christopher Polley
(74) *Attorney, Agent, or Firm* — Burr & Brown, PLLC

(57) ABSTRACT

A ligneous decorative design part having a high degree of originality and excellent design, and exhibiting a novel handsome appearance, due to properties of a ligneous material which has translucency when impregnated with a resin material. The ligneous decorative design part has a surface layer portion including a ligneous sliced veneer which is impregnated with a resin material and disposed on a side of a front surface of the surface layer portion, and which defines a decorative design surface, and a base layer portion superposed on a back surface of the surface layer portion, and formed integrally with the surface layer portion. The surface layer portion has translucency, and the ligneous decorative design part further includes another material interposed between the surface layer portion and the base layer portion and which is visible on a side of the front surface of the surface layer portion.

4 Claims, 12 Drawing Sheets

(51) Int. Cl.
   *B44C 5/04*    (2006.01)
   *B44C 5/06*    (2006.01)
   *B44F 1/06*    (2006.01)
   *B60R 13/02*   (2006.01)
(52) U.S. Cl.
   CPC ....... *B60R 13/02* (2013.01); *Y10T 428/24868* (2015.01)

(56) References Cited

FOREIGN PATENT DOCUMENTS

| | | | |
|---|---|---|---|
| JP | 2006-247974 A | 9/2006 |
| JP | 4502848 B2 | 7/2010 |
| JP | 4849609 l12 | 1/2012 |
| JP | 2013-075449 A1 | 4/2013 |

OTHER PUBLICATIONS

U.S. Appl. No. 14/717,021, filed May 20, 2015, Nagase et al.
U.S. Appl. No. 14/793,031, filed Jul. 7, 2015, Nagase et al.
Chinese Office Action (With English Translation), Chinese Application No. 201510276609.6, dated Feb. 20, 2017 (17 pages).
Chinese Office Action, Chinese Application No. 201510276609.6, dated Dec. 5, 2017 (8 pages).

\* cited by examiner

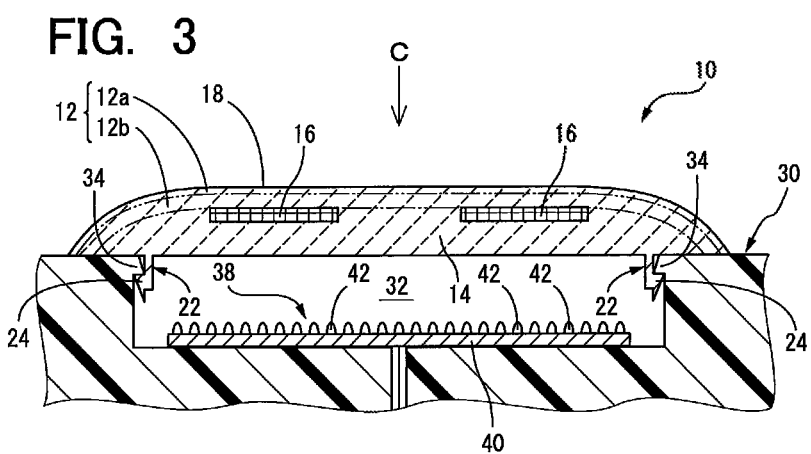

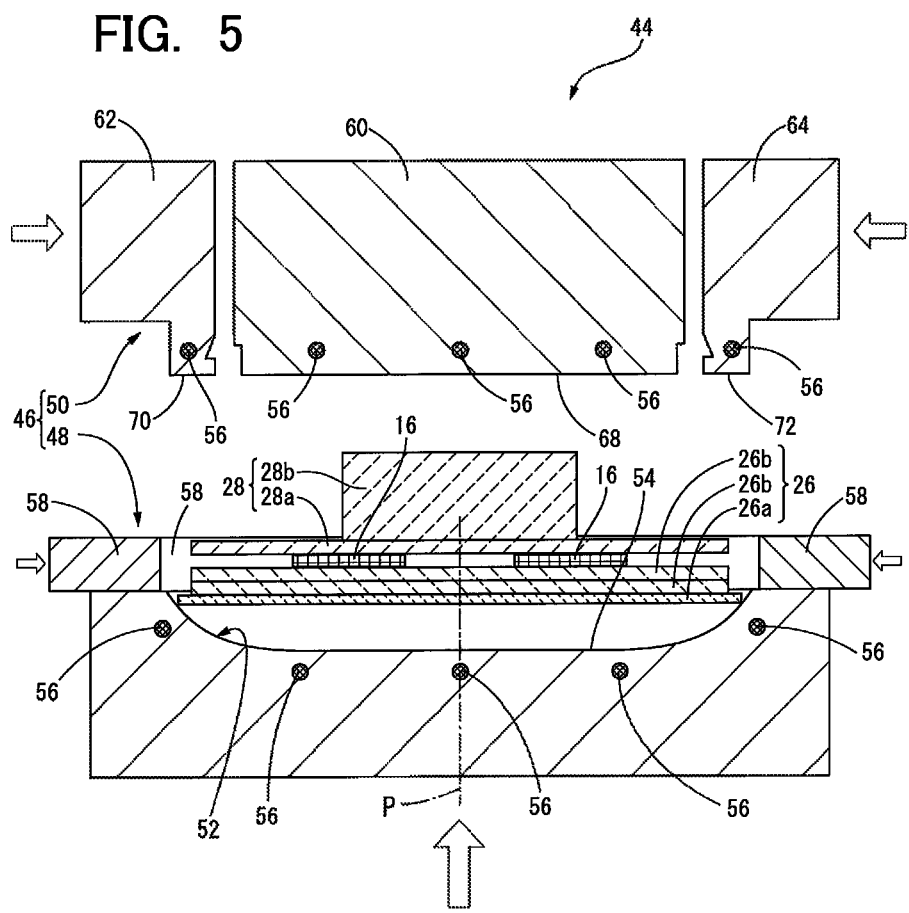

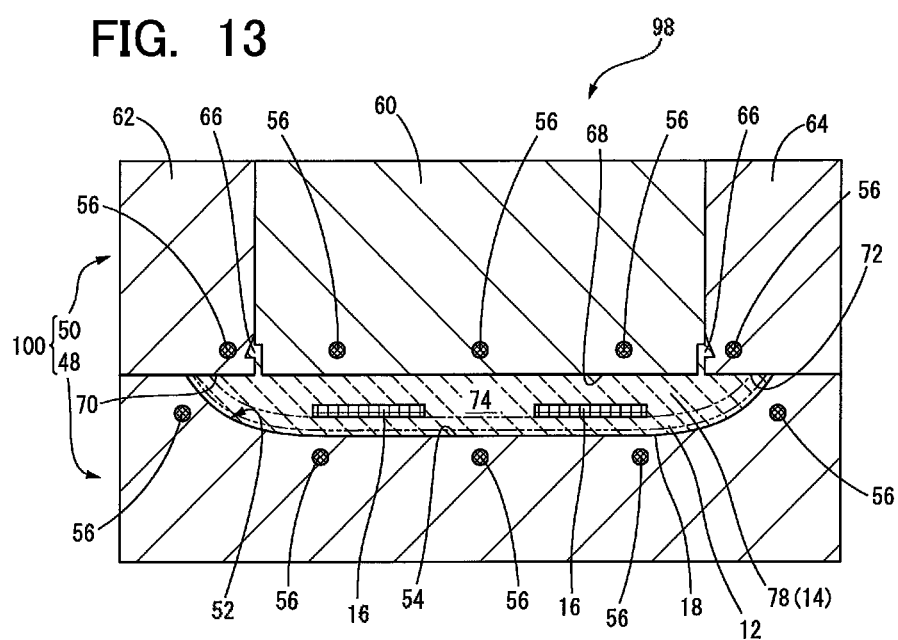

LIGNEOUS DECORATIVE DESIGN PART, AND METHOD OF PRODUCING THE SAME

CROSS REFERENCE TO RELATED APPLICATION

The present application is based on Japanese Patent Application No. 2014-109490 filed on May 27, 2014 the contents of which are incorporated herein by reference.

BACKGROUND OF THE INVENTION

Field of the Invention

The present invention relates generally to a ligneous decorative design part, and a method of producing the same, and more particularly to a ligneous decorative design part exhibiting a novel handsome appearance, and a method which permits advantageous production of the ligneous decorative design part.

Description of Related Art

There have been widely used formed ligneous bodies formed from various kinds of lumber (timber) and bamboo, as components of architectural floor panels, furniture and fittings. In the field of automotive vehicles, for example, there has been a growing demand for interior parts having a texture or appearance of wood, keeping pace with a recently increased desire for enhancement of quality of the vehicles. To meet this growing demand, formed ligneous bodies have been increasingly utilized as outer panels and surface panels of the interior parts of the automotive vehicles. Further, recent diversity of users' desires or demands relating to the decorative design requires ligneous decorative design parts having high degrees of originality and excellence in design.

Under the circumstances described above, JP-A-2013-75449 discloses a translucent decorative member which is a laminar body including a sliced veneer layer, a veiling layer and a decorative layer. The sliced veneer layer is formed from a translucent thin ligneous sheet which has a desired woody grain, and which is obtained by a WPC (Wood Plastic Combination) process in which the ligneous sheet is impregnated with a resin material, and the veiling layer has a predetermined degree of translucency, while the decorative layer also has translucency and a woody grain pattern having a desired woody grain or a desired tone of color.

In the translucent decorative member described above, the WPC process permits the sliced veneer layer in the form of the thin ligneous sheet to have a sufficiently high degree of translucency, without a need of considerably reducing the thickness of the thin ligneous sheet, so that the woody grain pattern of the decorative layer can be clearly and definitely seen on the side of the front surface of the translucent decorative member, together with the woody grain on the surface of the thin ligneous sheet when the translucent decorative member is exposed to a light incident from the side of its back surface. Thus, the woody grain of the sliced veneer layer and the woody grain pattern of the decorative layer are observed in combination with each other, giving the translucent decorative member an enhanced natural appearance in terms of its sliced veneer. When the translucent decorative member is not exposed to the light incident from the side of its back surface, the veiling layer veils the woody grain pattern of the decorative layer, namely, prevents the woody grain pattern from being seen on the side of the front surface of the translucent decorative member, so that only the woody grain of the sliced veneer layer is observed on the side of the front surface, giving the translucent decorative member a ligneous appearance of the woody grain similar to that of an ordinary ligneous decorative member. As described above, the translucent decorative member has a considerably large difference between its appearances when it is exposed to the light and when it is not exposed to the light. This difference improves the excellence in design of the translucent decorative member.

However, the decorative design of the prior art decorative member is based on a conventionally used woody grain, and does not sufficiently satisfy the users' desires for enhanced originality in design. Further, this decorative member requires formation of the veiling layer for veiling the woody grain pattern of the decorative layer, and printing of the woody grain pattern on the decorative layer, giving rise to a potential drawback of an increased cost of manufacture of the decorative member.

On the other hand, Japanese Patent No. 4502848 and Japanese Patent No. 4849609 disclose a formed ligneous body produced by utilizing a so-called "flow molding" process, and a method of producing such a formed ligneous body. The formed ligneous body produced by utilizing the flow molding process described above has not only an advantage regarding the preservation of resources and environment, but also an advantage of presenting a genuine lumber feel. Further, the formed ligneous body produced by using a ligneous material the fiber cells of which are impregnated with a resin material has an advantage of high degrees of scratch-, water-, and weather-proof properties of its surface portion, even where the surface portion is not covered by a coating layer in the form of a transparent film.

However, the formed ligneous body produced by utilizing the flow molding process having the several advantages suffers from the following drawback. Namely, the flow of the entirety of the ligneous material within a forming cavity undesirably causes a high risk that the formed ligneous body has surface patterns or figures which are far different from, or deformed with respect to a natural woody grain, or aesthetically deteriorated. Thus, the technique to produce the formed ligneous body by utilizing the conventional flow molding process has extreme difficulty to obtain the ligneous decorative design part which can satisfy the users' desires or demands for enhanced originality and excellence in its design.

SUMMARY OF THE INVENTION

The present invention was made in view of the background art described above. It is therefore a first object of this invention to provide a ligneous decorative design part which has high degrees of originality and excellence in design and exhibits a novel handsome appearance, owing to properties of a ligneous material that can be given translucency by impregnation with a resin material. It is a second object of the invention to provide a method of advantageously producing such a ligneous decorative design part.

The first object indicated above can be achieved according to a first aspect of the present invention, which provides a ligneous decorative design part having: a surface layer portion including a ligneous sliced veneer which is impregnated with a resin material and disposed on the side of a front surface of the surface layer portion, and which gives the ligneous decorative design part a decorative design surface; and a base layer portion which is superposed on a back surface of the surface layer portion, and formed integrally with the surface layer portion, wherein the surface layer portion has translucency; and another material is interposed between the surface layer portion and the base layer portion, which another material being visible on the side of the front surface of the surface layer portion.

In one preferred form of the ligneous decorative design part according to the first aspect of the invention, the surface layer portion is a laminar body consisting of the sliced veneer and a translucency adjustor layer which is made of a ligneous material impregnated with a resin material, and integrally formed on a back surface of the sliced veneer, while the base layer portion is made of a ligneous material impregnated with a resin material, and has translucency, and wherein the translucency of the surface layer portion is adjusted by the translucency adjustor layer such that the another material is not visible on the side of the front surface of the surface layer portion when the ligneous decorative design part is not exposed to a light generated by a light source disposed on the side of a back surface of the base layer portion, and is visible on the side of the front surface of the surface layer portion when the ligneous decorative design part is exposed to the light generated by the light source.

In other preferred form of the ligneous decorative design part according to the first aspect of the invention, translucency of the another material is different from the translucency of the surface layer portion, or a wavelength of a light transmitted through or reflected by the another material is different from a wavelength of a light transmitted through or reflected by the surface layer portion.

In other preferred form of the ligneous decorative design part according to the first aspect of the invention, the another material is at least one of plants and insects.

In other preferred form of the ligneous decorative design part according to the first aspect of the invention, the sliced veneer is impregnated with a melamine resin.

The present invention also provides an automotive vehicle interior part which consists of the ligneous decorative design part according to the first aspect of the invention, and which is configured to be installed in a compartment of an automotive vehicle such that the decorative design surface of the surface layer portion is exposed to the inside of the compartment of the automotive vehicle.

The above-indicated second object can be achieved according to a second aspect of the invention, which provides a method of producing a ligneous decorative design part having: a surface layer portion having translucency and including a ligneous sliced veneer which is impregnated with a resin material and disposed on the side of a front surface of the surface layer portion, and which gives the ligneous decorative design part a decorative design surface; a base layer portion which is made of a base-layer-portion ligneous material impregnated with a resin material, and integrally formed on a back surface of the surface layer portion; and another material which is interposed between the surface layer portion and the base layer portion, and visible on the side of the front surface of the surface layer portion, the method comprising the steps of: (a) providing a surface-layer-portion ligneous material including the sliced veneer for forming the surface layer portion, the base-layer-portion ligneous material for forming the base layer portion, and the another material; (b) accommodating at least the surface-layer-portion ligneous material in a forming cavity; (c) curing or solidifying the resin material contained in the surface-layer-portion ligneous material accommodated in the forming cavity, thereby forming the surface layer portion; and (d) subjecting the base-layer-portion ligneous material to a flow molding process within the forming cavity, concurrently with or after formation of the surface layer portion, by heating and pressing the base-layer-portion ligneous material in such a state where the surface-layer-portion ligneous material and the base-layer-portion ligneous material are superposed on each other with the another material being interposed therebetween, such that the base-layer-portion ligneous material is forced to flow and shaped while the base-layer-portion ligneous material is compressed in a direction of superposition of the surface-layer-portion ligneous material and the base-layer-portion ligneous material, and the resin material contained in the base-layer-portion ligneous material is cured or solidified, thereby forming the base layer portion integrally with the surface layer portion formed within the forming cavity, such that the another material is interposed between the surface layer portion and the base layer portion.

In one preferred form of the method according to the second aspect of the invention, the surface-layer-portion ligneous material includes the sliced veneer, and at least one surface-layer-portion sheet each of which has an outer profile almost equal to that of the sliced veneer, while the base-layer-portion ligneous material is a laminar body consisting of a plurality of ligneous members which are superposed on each other in a direction of thickness thereof, and which include a base-layer-portion sheet having an outer profile almost equal to that of the sliced veneer, and wherein the base-layer-portion ligneous material is subjected to the flow molding process while the another material is accommodated in the forming cavity such that the another material is interposed between the at least one surface-layer-portion sheet and the base-layer-portion sheet.

In other preferred form of the method according to the second aspect of the invention, the surface-layer-portion ligneous material and the base-layer-portion ligneous material are impregnated with thermosetting resin materials, and a temperature of a surface of the forming cavity, which surface is held in contact with the surface-layer-portion ligneous material is higher than a temperature of another surface of the forming cavity, which another surface is held in contact with the base-layer-portion ligneous material.

In other preferred form of the method according to the second aspect of the invention, the surface-layer-portion ligneous material includes the sliced veneer and the at least one surface-layer-portion sheet which are sliced from lumbers in a direction parallel to a direction of extension of fibers, while the base-layer-portion ligneous material includes the base-layer-portion sheet sliced from a lumber in the direction parallel to the direction of extension of fibers and a base-layer-portion block sliced from a lumber in a direction perpendicular to the direction of extension of fibers.

The above-indicated second object can also be achieved according to a third aspect of the invention, which provides a method of producing a ligneous decorative design part having: a surface layer portion having translucency and including a ligneous sliced veneer which is impregnated with a resin material and disposed on the side of a front surface of the surface layer portion, and which gives the ligneous decorative design part a decorative design surface; a base layer portion which is made of a base-layer-portion ligneous material impregnated with a resin material, and integrally formed on a back surface of the surface layer portion; and another material which is interposed between the surface layer portion and the base layer portion, and visible on the side of the front surface of the surface layer portion, the method comprising the steps of: (a) providing a surface-layer-portion ligneous material including the sliced veneer for forming the surface layer portion, the base-layer-portion ligneous material for forming the base layer portion, and the another material; (b) accommodating the surface-layer-portion ligneous material in a first forming cavity which gives the surface layer portion; (c) heating and pressing the surface-layer-portion ligneous material accommodated in the first forming cavity, such that the resin material contained in the surface-layer-portion ligneous material is cured or solidified, thereby forming the surface layer portion; and (d) subjecting the base-layer-portion ligneous material to a flow molding process within a second forming cavity which gives the ligneous decorative design part, after formation of the surface layer portion, by heating and pressing the base-layer-portion ligneous material in such a state where the surface layer portion and the base-layer-portion ligneous material are superposed on each other with the another material being interposed therebetween, such that the base-layer-portion ligneous material is forced to flow and shaped while the base-layer-portion ligneous material is compressed in a direction of superposition of the surface layer portion and the base-layer-portion ligneous material, and the resin material contained in the base-layer-portion ligneous material is cured or solidified, thereby forming the base layer portion integrally with the surface layer portion, such that the another material is interposed between the surface layer portion and the base layer portion.

As described above, the ligneous decorative design part according to the first aspect of the present invention has: the surface layer portion including the ligneous sliced veneer which is impregnated with the resin material and disposed on the side of the front surface of the surface layer portion; and the base layer portion which is superposed on the back surface of the surface layer portion, and formed integrally with the surface layer portion. The ligneous decorative design part further comprises the another material which is different from materials of the surface layer portion and the base layer portion and which is interposed between the surface layer portion and the base layer portion. The surface layer portion has translucency, and the another material is visible on the side of the front surface of the surface layer portion. Accordingly, the ligneous decorative design part exhibits not only an appearance of wood in the presence of the sliced veneer, but also a novel handsome appearance owing to visibility of the above-described another material through the surface layer portion. In addition, the ligneous sliced veneer impregnated with the resin material and disposed on the side of the front surface of the surface layer portion not only advantageously makes the surface layer portion have translucency, but also enables the ligneous decorative design part to have high degrees of scratch-, water- and weather-proof properties.

The methods according to the second and third aspects of this invention to produce the ligneous decorative design part have substantially same advantages as described above with respect to the ligneous decorative design part according to the first aspect of the invention. In particular, according to the present methods, the base layer portion is formed from the base-layer-portion ligneous material impregnated with the resin material, by the flow molding process in which the base-layer-portion ligneous material is heated and pressed within the forming cavity such that the base-layer-portion ligneous material is forced to flow and shaped while it is compressed, whereby the thus produced ligneous decorative design part more advantageously exhibits an improved appearance of wood.

BRIEF DESCRIPTION OF THE DRAWINGS

FIG. 3 is a schematic cross sectional view showing an example of installation of the ligneous decorative design part shown in FIG. 1 such that a light source is disposed on the back side of the ligneous decorative design part;

FIG. 5 is a schematic cross sectional view showing an example of a step of a method of production of the ligneous decorative design part of FIG. 1, in which a surface-layer-portion ligneous material and a base-layer-portion ligneous material are set in a forming mold of a heating and pressing device such that another material is disposed between the surface-layer-portion and base-layer-portion ligneous materials;

FIG. 13 is a schematic cross sectional view showing an example of a step implemented following the step shown in FIG. 12, in which the base-layer-portion ligneous material is subjected to a flow molding process by the heating and pressing device in a closed state of the forming mold, to form the ligneous decorative design part.

DETAILED DESCRIPTION OF THE INVENTION

To further clarify the present invention, preferred embodiments of the invention will be described in detail by reference to the drawings.

Figure 1A:
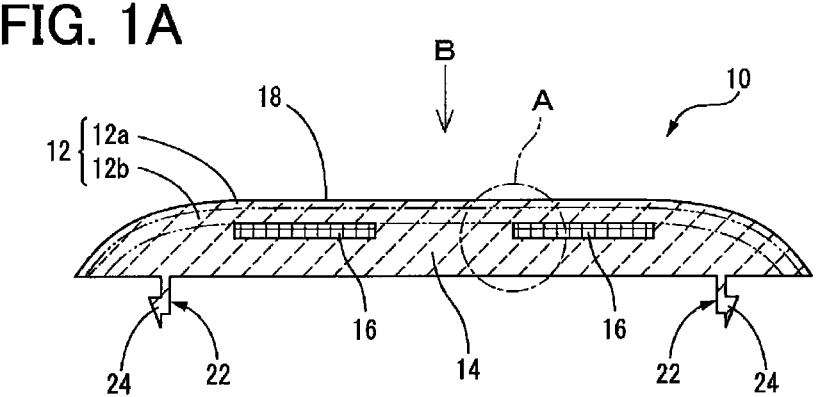
FIGS. 1A and 1B are schematic views showing a ligneous decorative design part having a structure according to one embodiment of this invention, FIG. 1A being a cross sectional view of the ligneous decorative design part, and FIG. 1B being an enlarged view of a portion A in FIG. 1A.
Figure 1B:
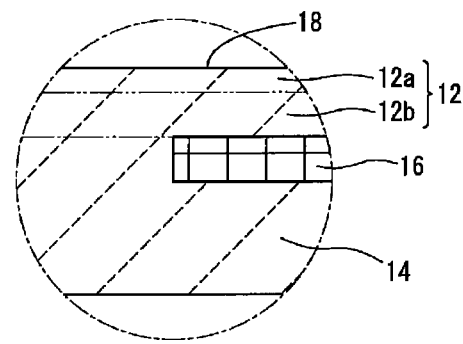
Figure 2:
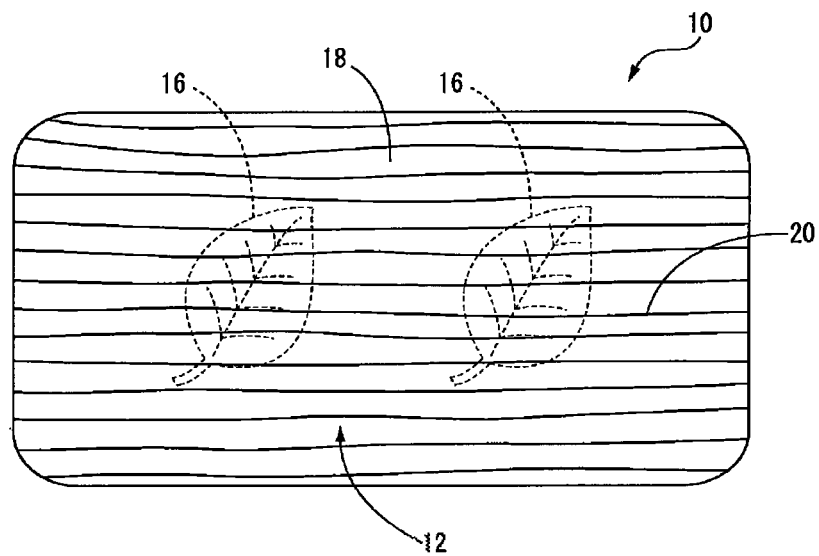
FIG. 2 is a plan view taken in a direction of an arrow B in FIG. 1A.

Referring to the cross sectional views of FIG. 1 and the plan view of FIG. 2, there is shown a ligneous decorative design part or member according to one embodiment of this invention, in the form of an automotive vehicle interior part 10. As is apparent from FIGS. 1 and 2, the automotive vehicle interior part or member 10 (hereinafter referred to simply as an "interior part 10") takes the form of a generally elongate rectangular plate having a relatively large thickness and composed of a surface layer portion 12 and a base layer portion 14 which are formed integrally with each other. Between the surface layer portion 12 and the base layer portion 14, there are interposed plant leaves 16.

Described more specifically, the surface layer portion 12 is a curved portion having a relatively small thickness and covering an entirety of a front surface (an upper surface as seen in FIG. 1) of the interior part 10. The surface layer portion 12 consists of a sliced veneer 12a disposed on the side of its front or exposed surface, and a translucency adjustor layer 12b disposed on the side of its back surface and formed integrally with the sliced veneer 12a, as shown in FIG. 1B. The entirety of the exposed surface of the sliced veneer 12a (the surface layer portion 12) serves as a decorative design surface 18. In the present embodiment, the decorative design surface 18 has a natural and fine woody grain 20 in a straight or regular pattern (or a cross or irregular pattern) as shown in FIG. 2, and the sliced veneer 12a having the decorative design surface 18 of the surface layer portion 12 is formed from a bird's-eye maple, walnut or any other high-grade lumber (timber) having a neat appearance, while the translucency adjuster layer 12b is formed from a relatively inexpensive lumber (timber) such as an agathis.

On the other hand, the base layer portion 14 is a relatively thick portion which has an entire flat back surface (a lower surface as seen in FIG. 1) of the interior part 10 and which is the remainder of the interior part 10 other than the surface layer portion 12. The base layer portion 14 functions to reinforce the surface layer portion 12, and to fixedly hold another material in the form of the plant leaves 16 such that the plant leaves 16 are insulated from the ambient air, as described below, to prevent deterioration of the plant leaves 16. In the present embodiment, the base layer portion 14 is formed from a relatively inexpensive lumber (timber) such as an agathis. The base layer portion 14 is provided with integrally formed fixing hooks 22 which project from the back surface and which are formed from the same ligneous material with the base layer portion 14. Each of these fixing hooks 22 has a known structure consisting of a flexible plate-like support portion, and a jaw portion 24 which is formed integrally with the support portion so as to extend from the distal end of the support portion. The fixing hooks 22 are provided to fix the interior part 10 to a predetermined part of an automotive vehicle, with a single pressing action.

In the present embodiment, the surface layer portion 12 and the base layer portion 14 are formed into desired shapes and integrated with each other to form the interior part 10, by a flow molding process using ligneous materials (a surface-layer-portion ligneous material 26 and a base-layer-portion ligneous material 28, which will be described below) impregnated with resin materials. Described more specifically, fiber cell walls of the ligneous materials of the surface layer portion 12 and the base layer portion 14 are impregnated with the resin materials in the form of thermosetting resins, such as a melamine resin, and the resin materials are cured, so that the surface layer portion 12 and the base layer portion 14 have translucency. In this respect, it is noted that translucency of the surface layer portion 12 is adjusted to a desired value in the presence of the translucency adjustor layer 12b, as described below in detail.

Between the surface layer portion 12 and the base layer portion 14, there are interposed the plant leaves 16 such that the plant leaves 16 are fixed at predetermined positions. Namely, the surface layer portion 12 and the base layer portion 14 are formed integrally with each other, with the plant leaves 16 being sandwiched therebetween.

The interior part 10 having the structure described above is fixed to a desired vehicle part 30 such as a dash panel, which is disposed within a compartment of an automotive vehicle, and which is formed of a resin material, as shown in FIG. 3. In the specific example of FIG. 3, the vehicle part 30 has a recess 32 which is open in a surface (an upper surface as seen in FIG. 3) thereof and which has a rectangular shape in cross section. The interior part 10 is fixed to the vehicle part 30 such that the jaw portions 24 formed at the distal ends of the fixing hooks 22 are held in engagement with respective protruding portions 34 formed along opening edges of the recess 32.

On a bottom surface of the recess 32 opposed to the back surface of the interior part 10, there is disposed a light source 38 having a mounting board 40 and a plurality of light emitting portions 42 mounted on the mounting board 40. Each of the light emitting portions 42 is a LED (light emitting diode), a light bulb, a fluorescent light or a planar light emitting body (an organic EL sheet), for example. The light source 38 is turned on and off according to an operating state of a switch, or a control signal generated by an electronic control device provided on the automotive vehicle.

Figure 4A:
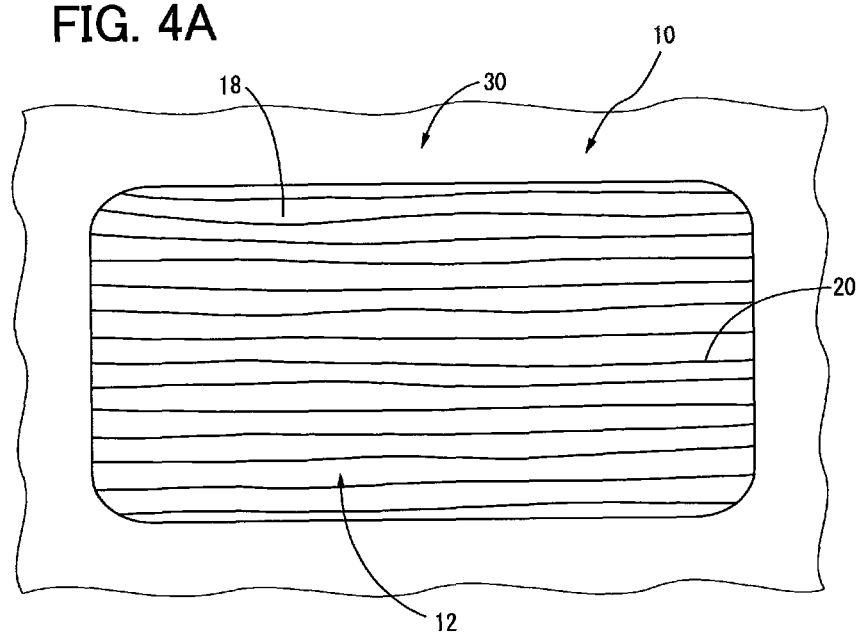
FIGS. 4A and 4B are schematic views taken in a direction of an arrow C in FIG. 3, FIG. 4A being a view showing the ligneous decorative design part when it is not exposed to a light, and FIG. 4B being a view showing the ligneous decorative design part when it is exposed to the light.

When the light source 38 is placed in an off state, in other words, when the interior part 10 fixed to the vehicle part 30 as described above is not exposed to a light generated by the light source 38, the plant leaves 16 are veiled by the surface layer portion 12 (the sliced veneer 12a and the translucency adjustor layer 12b), as shown in FIG. 4A, so that the plant leaves 16 are not visible on the side of the front surface (the decorative design surface 18) of the interior part 10, and only the woody grain 20 on the surface of the sliced veneer 12a is exposed on the decorative design surface 18 of the interior part 10. Thus, the interior part 10 exhibits an ordinary appearance of wood.

Figure 4B:
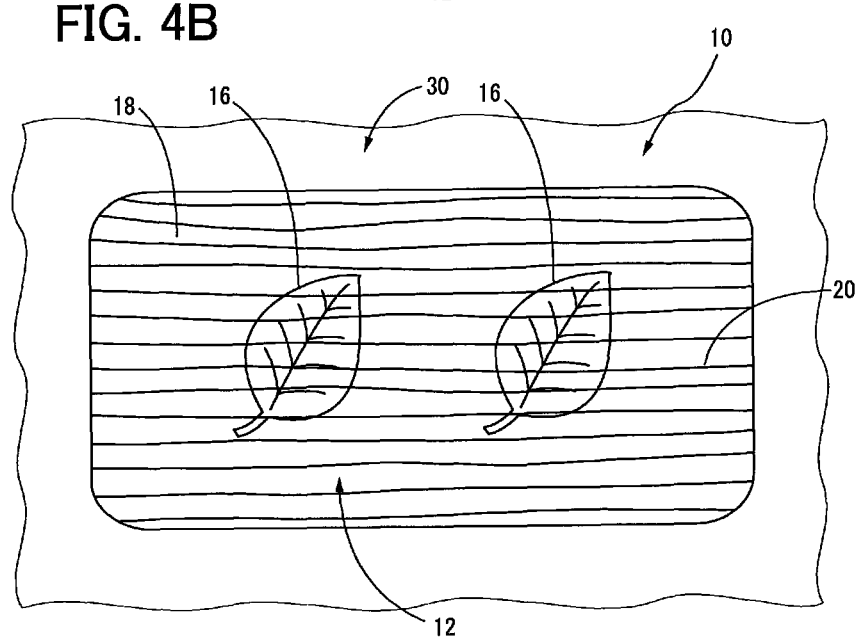

When the light source 38 is placed in an on state, in other words, when the interior part 10 is exposed to the light generated by the light source 38, the plant leaves 16 are visible on the side of the front surface (the decorative design surface 18) of the interior part 10, through the surface layer portion 12 (the sliced veneer 12a and the translucency adjustor layer 12b), as shown in FIG. 4B. That is, translucency of the plant leaves 16 is lower than that of the surface layer portion 12 (the sliced veneer 12a and the translucency adjustor layer 12b), and the translucency of the surface layer portion 12 is adjusted to permit the light generated by the light source 38 to be transmitted through the translucent base layer portion 14 toward the front surface of the interior part 10, so that the plant leaves 16 are visible on the side of the decorative design surface 18. Accordingly, the interior part 10 exhibits a novel handsome appearance owing to visibility of the plant leaves 16, as well as the appearance of wood owing to the woody grain 20 on the front surface of the sliced veneer 12*a*.

As described above, in the interior part 10 according to the present embodiment, the translucency of the surface layer portion 12 is adjusted by the translucency adjustor layer 12*b*, such that the another material in the form of the plant leaves 16 is not visible on the side of the front surface (the decorative design surface 18) of the surface layer portion 12 when the interior part 10 is not exposed to the light generated by the light source 38, and is visible on the side of the front surface (the decorative design surface 18) of the surface layer portion 12 when the interior part 10 is exposed to the light generated by the light source 38.

The interior part 10 having the structure described above can be advantageously produced by the method which will be described.

Namely, the surface-layer-portion ligneous material 26 and the base-layer-portion ligneous material 28 to form the respective surface layer portion 12 and base layer portion 14 of the desired interior part 10, and the plant leaves 16 are initially provided.

In the present embodiment, a sliced veneer sheet 26*a* and a plurality of (two in this specific example) of translucency adjustor sheets 26*b* are provided as the surface-layer-portion ligneous material 26, as shown in FIG. 5. The sliced veneer sheet 26*a* is a thin elongate rectangular flat sheet sliced from the bird's-eye maple lumber in a direction parallel to the direction of extension of the fibers of the lumber, while each of the translucency adjustor sheets 26*b* is a thin elongate rectangular flat sheet sliced from the agathis lumber in the direction parallel to the direction of extension of the fibers of the lumber. The sliced veneer sheet 26*a* has an outer profile (a surface area) which is smaller than that of the interior part 10 (the decorative design surface 18). The outer profile of the sliced veneer sheet 26*a* is preferably not less than 80% of that of the interior part 10 (the decorative design surface 18). Namely, it is desirable that the outer profile of the sliced veneer sheet 26*a* is smaller than that of the interior part 10 by a predetermined amount, but the former outer profile may be equal to or larger than the latter outer profile. Each of the translucency adjustor sheets 26*b* has an outer profile almost equal to that of the sliced veneer sheet 26*a*. In this specific example, the outer profile of the translucency adjustor sheets 26*b* is slightly smaller than that of the sliced veneer sheet 26*a*, as is apparent from FIG. 5. It is noted that the "outer profile" is interpreted to mean a projection surface area of each member (the sheet 26*a*, 26*b*, the interior part 10) as seen in a direction perpendicular to its plane (plane of FIG. 2.

On the other hand, a base-layer-portion sheet 28*a* and a base-layer-portion block 28*b* are provided as the base-layer-portion ligneous material 28, as also shown in FIG. 5. The base-layer-portion sheet 28*a* is a thin elongate rectangular flat sheet sliced from the agathis lumber in the direction parallel to the direction of extension of the fibers of the lumber, while the base-layer-portion block 28*b* is a rectangular block cut from the agathis lumber in a direction perpendicular to the direction of extension of the fibers of the lumber. The base-layer-portion sheet 28*a* has an outer profile almost equal to that of the sliced veneer sheet 26*a*. In this specific example, the outer profile of the base-layer-portion sheet 28*a* is slightly smaller than that of the sliced veneer sheet 26*a*, and is almost equal to that of the translucency adjustor sheets 26*b*. The base-layer-portion block 28*b* has a height (thickness) larger than the thickness of the base-layer-portion sheet 28*a*, and an outer profile smaller than that of the base-layer-portion sheet 28*a*, as is apparent from FIG. 5.

Then, the walls of the fiber cells of each ligneous material (the sliced veneer sheet 26*a*, translucency adjustor sheets 26*b*, base-layer-portion sheet 28*a* and base-layer-portion block 28*b*), which fiber cells are principally composed of cellulose, are impregnated with the melamine resin. In the present embodiment, an aqueous solution of the melamine resin is initially accommodated in a bath disposed within a suitable pressure vessel, and the ligneous materials 26*a*, 26*b*, 28*a* and 28*b* are immersed in the aqueous solution of the melamine resin, so that the fiber cells of the ligneous materials 26*a*, 26*b*, 28*a* and 28*b* are impregnated with the aqueous solution of the melamine resin, by a so-called "evacuating and pressurizing process" in which the pressure within the pressure vessel is reduced and raised to introduce the aqueous solution of the melamine resin into the fiber cells of the ligneous materials 26*a*, 26*b*, 28*a* and 28*b*.

While the molecular weight of the melamine resin in the aqueous melamine resin solution accommodated in the bath is not particularly limited, the average molecular weight of the melamine resin is preferably as small as not larger than about 2000, because the average molecular weight of the melamine resin larger than 2000 is excessively large, giving rise to a risk of difficulty and an excessively small amount of impregnation of the fiber cell walls of the ligneous materials 26*a*, 26*b*, 28*a* and 28*b* with the melamine resin, and a consequent insufficient effect of impregnation of the fiber cell walls of the ligneous materials 26*a*, 26*b*, 28*a* and 28*b* with the melamine resin.

While the concentration of the aqueous melamine resin solution accommodated in the bath is not particularly limited, the concentration is preferably held within a range of about 10-50%, because the concentration of the aqueous melamine resin solution lower than 10% gives rise to insufficiency of an amount of impregnation of the fiber cell walls of the ligneous materials 26*a*, 26*b*, 28*a* and 28*b* with the melamine resin, and a consequent insufficient effect of impregnation of the fiber cell walls of the ligneous materials 26*a*, 26*b*, 28*a* and 28*b* with the melamine resin, while the concentration of the aqueous melamine resin solution higher than 50% gives rise to a risk of an excessively large amount of impregnation of the fiber cell walls of the ligneous materials 26*a*, 26*b*, 28*a* and 28*b* with the melamine resin, a consequent excessive amount of increase of the weight of the interior part 10 to be obtained as the end product, and a risk of flow of the melamine resin from the ligneous materials in a subsequent step (a flow molding process), which may cause formation of burrs outside the desired outer profile of the end product.

Subsequently, the ligneous materials 26*a*, 26*b*, 28*a* and 28*b* impregnated with the aqueous melamine resin solution are taken out of the pressure vessel, and are left in the atmosphere, or subjected to a blow of hot air, so that the ligneous materials 26*a*, 26*b*, 28*a* and 28*b* are dried, whereby the walls of the fiber cells of the ligneous materials 26*a*, 26*b*, 28*a* and 28*b* are efficiently impregnated with the aqueous melamine resin solution contained in those fiber cells.

As a result of impregnation of the fiber cell walls of the ligneous materials 26*a*, 26*b*, 28*a* and 28*b* with the aqueous melamine resin solution, the molecules of the melamine resin are adsorbed among molecular chains of the fiber cells (cellulose) of the ligneous materials 26*a*, 26*b*, 28*a* and 28*b* which are cross-linked by hydrogen bonds, whereby the hydrogen bonds are cut. Namely, the present embodiment is configured such that a step of cutting the hydrogen bonds among the fiber cells of the ligneous materials 26a, 26b, 28a and 28b is implemented concurrently with a step of impregnating the fiber cell walls of the ligneous materials 26a, 26b, 28a and 28b with the aqueous melamine resin solution.

As described above, the sliced veneer sheet 26a and the translucency adjustor sheets 26b, which are impregnated with the melamine resin are provided as the surface-layer-portion ligneous material 26, and the base-layer-portion sheet 28a and the base-layer-portion block 28b, which are impregnated with the melamine resin are provided as the base-layer-portion ligneous material 28.

Further, the plant leaves 16 which give the interior part 10 a desired appearance (decorative design) are obtained from a suitably selected plant. Preferably, the plant leaves 16 are sufficiently dried, such that the plant leaves 16 has a moisture content not higher than the moisture content in an air-dried state, more preferably, equal to the moisture content (zero %) in a fully dried state. For instance, the plant leaves 16 are subjected to a forced-drying process, for example, dried in an atmosphere having a temperature of not lower than 105° C., or at a reduced pressure, and then used for the production of the interior part 10, immediately after termination of such a drying process. In this respect, it is noted that a large amount moisture left in the plant leaves 16 (the another material) gives rise to a risk of generation of a steam during or after production of the interior part 10, leading to creation of air gaps or breakage in the surface layer portion 12, and resulting in deterioration of the decorative design of the interior part 10.

Then, the surface-layer-portion ligneous material 26 (the sliced veneer sheet 26a and the translucency adjustor sheets 26b) and the base-layer-portion ligneous material 28 (the base-layer-portion sheet 28a and the base-layer-portion block 28b) which have been provided as described above are subjected to the flow molding process by using a heating and pressing device 44, as shown in FIGS. 5-8.

As is apparent from FIGS. 5-8, the heating and pressing device 44 used in the present embodiment has a forming mold 46. This forming mold 46 includes a lower die 48 and an upper die 50 which is disposed above and in opposition to the lower die 48 with a predetermined distance therebetween.

The lower die 48 of the forming mold 46 is movable in the vertical direction by a predetermined distance, by a moving device (not shown) which includes a hydraulic cylinder or the like and which has a structure known in the art. The lower die 48 has a recess 52 open in its upper surface. This recess 52 has an inner surface of a generally elongate rectangular shape, which serves as a downwardly curved cavity surface 54 which corresponds to the decorative design surface 18 of the surface layer portion 12 (the interior part 10). Further, the lower die 48 has a plurality of cartridge heaters 56 embedded therein in the vicinity of the cavity surface 54. These cartridge heaters 56 are controlled of their heating temperature, by a controller not shown, so that the cavity surface 54 is heated to a predetermined temperature by the cartridge heaters 56 under the control of the controller.

On the upper surface of the lower die 48, there are disposed four deformation preventive portions 58 (three of which are shown in FIGS. 5-8). These four deformation preventive portions 58 are four divisions of a thick annular metal plate, which are arranged in the circumferential direction of the annular metal plate. The annular metal plate has an elongate rectangular center hole which is smaller than the opening of the recess 52. The four deformation preventive portions 58 are connected to respective hydraulic cylinders (not shown) so that the deformation preventive portions 58 are moved in a horizontal plane in respective radial directions toward and away from a center axis P of the lower die 48.

On the other hand, the upper die 50 includes a first split-die member 60 disposed in its central part, and a second split-die member 62 and a third split-die member 64 which are disposed on respective opposite sides in the longitudinal direction (the right and left direction as seen in FIGS. 5-8) of the recess 52 of the lower die 48, such that the first split-die member 60 is interposed between the second and third split-die members 62 and 64. In the present embodiment, the first split-die member 60 is fixed in position, and the second split-die member 62 and the third split-die member 64 are movable toward and away from the first split-die member 60, by hydraulic cylinders or any other known moving devices not shown. Movements of the second and third split-die members 62 and 64 toward the first split-die member 60 cause abutting contact of the first, second and third split-die members 60, 62 and 64 with each other on their mutually opposed surfaces. These opposed surfaces of the first, second and third split-die members 60, 62 and 64 in abutting contact with each other define fixing-hook forming cavities 66 which are open downwards, and which are provided to form the above-described fixing hooks 22 integrally with the back surface of the base layer portion 14 (the interior part 10).

The first, second and third split-die members 60, 62 and 64 have respective flat lower surfaces, which function as respective first, second and third pressure surfaces 68, 70 and 72. In the present embodiment, the cavity surface 54 of the lower die 48, the pressure surfaces 68, 70 and 72 of the upper die 50 (the split-die members 60, 62 and 64), and the lower surfaces of the four deformation preventive portions 58 cooperate to define a forming cavity 74. Each of the split-die members 60, 62 and 64 has a plurality of cartridge heaters 56 or one cartridge heater 56 embedded therein in the vicinity of the pressure surfaces 68, 70 and 72. Like the cartridge heaters 56 embedded in the lower die 48, the cartridge heaters 56 of the upper die 50 are controlled of their heating temperatures, by the controller not shown, so that the pressure surfaces 68, 70 and 72 are heated to predetermined temperatures by the cartridge heaters 56 under the control of the controller.

To perform the flow molding process with respect to the surface-layer-portion ligneous material 26 and the base-layer-portion ligneous material 28, by using the heating and pressing device 44 having the thus constructed forming mold 46, the surface-layer-portion ligneous material 26, the base-layer-portion ligneous material 28 and the plant leaves 16 are accommodated in the recess 52 of the lower die 48, while the upper die 50 and the lower die 48 are vertically spaced apart from each other, with the four deformation preventive portions 58 being located at a predetermined retracted position spaced apart from the center axis P of the lower die 48, as shown in FIG. 5.

The surface-layer-portion ligneous material 26 is accommodated in the recess 52 such that the sliced veneer sheet 26a is held in a substantially horizontally extending posture, and such that the periphery of the sliced veneer sheet 26a is held in engagement with the peripheral portion of the cavity surface 54 in the vicinity of the opening of the recess 52, so that the opening of the recess 52 is covered by the sliced veneer sheet 26a. Further, the two translucency adjustor sheets 26b are superposed on the sliced veneer sheet 26a.

Then, the plant leaves 16 are placed at predetermined positions on the upper one (as seen in FIG. 5) of the two translucency adjustor sheets 26b. Further, the base-layer-portion ligneous material 28 is disposed such that the base-layer-portion sheet 28a covers the entirety of the plant leaves 16, and the base-layer-portion block 28b is placed in a central portion of the upper surface of the base-layer-portion sheet 28a.

After or before the surface-layer-portion ligneous material 26, the plant leaves 16 and the base-layer-portion ligneous material 28 are positioned with respect to the recess 52 as described above, the cavity surface 54 of the lower die 48 is heated by the plurality of cartridge heaters 56 embedded in the lower die 48, to a temperature higher than the curing point of the melamine resin contained in the fiber cell walls of the surface-layer-portion ligneous material 26 and the base-layer-portion ligneous material 28, and the cavity surface 54 is kept at this temperature. On the other hand, the first, second and third pressure surfaces 68, 70 and 72 of the first, second and third split-die members 60, 62 and 64 are heated by the cartridge heaters 56 embedded in the split-die members 60, 62 and 64, to the curing point of the melamine resin, and the pressure surfaces 68, 70 and 72 are kept at this temperature. Described more specifically, the cavity surface 54 is heated to and kept at a temperature of about 180° C., while the first, second and third pressure surfaces 68, 70 and 72 are heated to and kept at a temperature of about 150° C. Although the optimum heating temperatures of the cavity surface 54 and the first, second and third pressure surfaces 68, 70 and 72 are influenced by the curing point and the melting point of the resin material used to impregnate the ligneous materials 26 and 28, the optimum temperatures are generally selected within a range of about 100-200° C.

Figure 6:
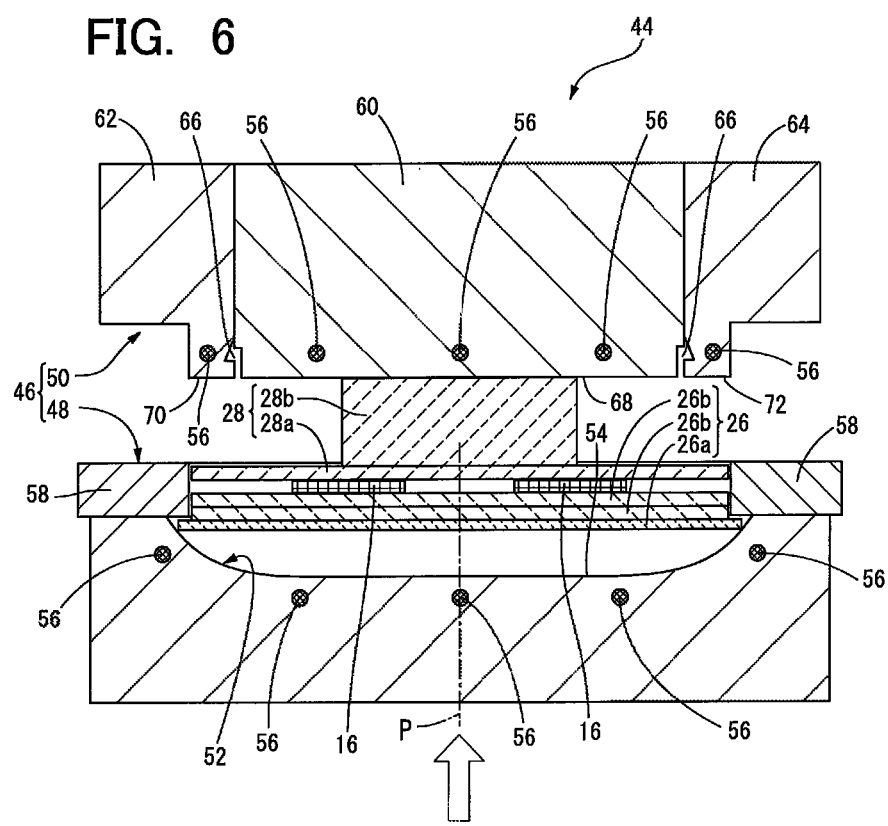
FIG. 6 is a schematic cross sectional view showing an example of a step implemented following the step shown in FIG. 5, in which an upper die of the forming mold comes into contact with an upper surface of the base-layer-portion ligneous material, in a process of a closing action of the forming mold.

Then, as shown in FIG. 6, the four deformation preventive portions 58 are moved to a predetermined advanced position radially close to the center axis P of the lower die 48, for abutting contact with each other in the circumferential direction, while at the same time, the second and third split-die members 62 and 64 are moved into abutting contact with the first split-die member 60, so that these three split-die members 60, 62 and 64 cooperate to form the upper die 50, and the lower die 48 is moved upwards.

During the above-described movements of the deformation preventive portions 58, the second and third split-die members 62 and 64 and the lower die 48, the surface-layer-portion ligneous material 26 opposed to and located in the vicinity of the cavity surface 54 is heated by the heat of the cavity surface 54, so that the surface-layer-portion ligneous material 26 as a whole is softened. Further, the upward movement of the lower die 48 causes the upper surface of the base-layer-portion ligneous material 28 (the base-layer-portion block 28b) to be brought into pressing contact with the first pressure surface 68 of the first split-die member 60 of the upper die 50, so that the base-layer-portion block 28b is heated by the first pressure surface 68.

Figure 7:
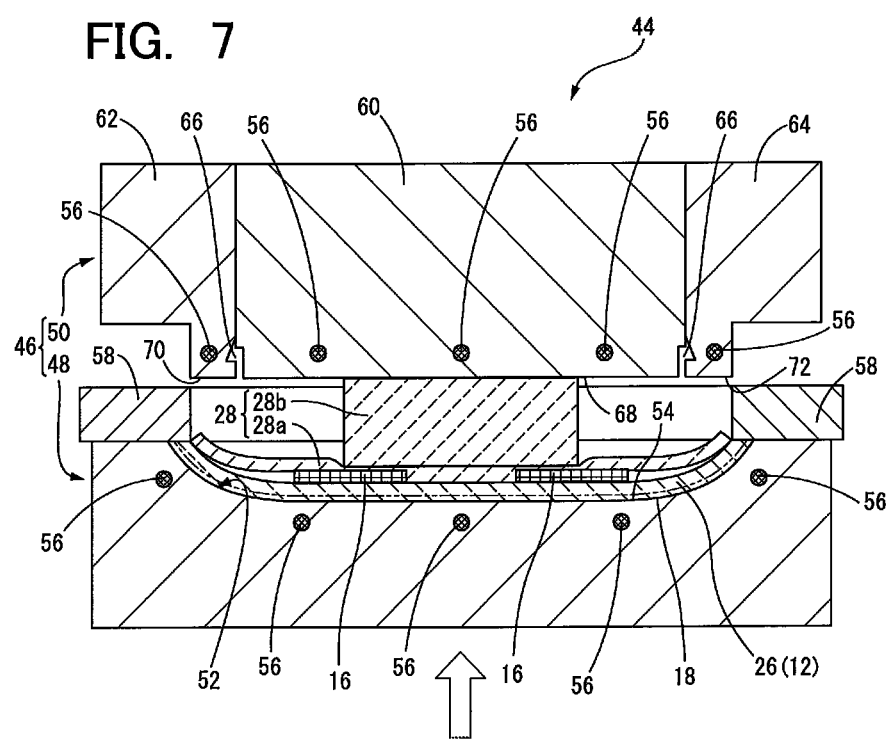
FIG. 7 is a schematic cross sectional view showing an example of a step implemented following the step shown in FIG. 6, in which the surface layer portion is formed by the heating and pressing device in the process of the closing action of the forming mold.

As shown in FIG. 7, the lower die 48 is further moved upwards from the position of FIG. 6, so that the surface-layer-portion ligneous material 26 and the base-layer-portion ligneous material 28 are pressed or compressed by the first, second and third pressure surfaces 68, 70 and 72 in the direction of mutual superposition of those ligneous materials 26 and 28.

Since the entirety of the surface-layer-portion ligneous material 26 has already been softened, the surface-layer-portion ligneous material 26 is pressed onto the cavity surface 54 by the upper die 50 via the base-layer-portion ligneous material 28, and is thereby shaped so as to follow the shape of the cavity surface 54. The thus shaped surface-layer-portion ligneous material 26, whose lower surface (as seen in FIG. 7) is entirely held in contact with the cavity surface 54 heated to the temperature higher than the curing point of the melamine resin, is rapidly heated to the curing point of the melamine resin, so that the melamine resin contained in the surface-layer-portion ligneous material 26 is cured. Thus, the surface-layer-portion ligneous material 26 is given a permanent shape corresponding to that of the cavity surface 54, whereby the surface layer portion 12 is formed, such that the surface of the surface layer portion 12 in contact with the cavity surface 54 serves as the decorative design surface 18. At this time, the plant leaves 16 are pressed onto the surface layer portion 12 (the surface-layer-portion ligneous material 26) such that the upper surfaces of the plant leaves 16 are covered by the base-layer-portion sheet 28a whose outer profile is almost equal to that of the surface-layer-portion ligneous material 26 (the sliced veneer sheet 26a).

It is noted that the hydrogen bonds among the fiber cells of the surface-layer-portion ligneous material 26 have been cut as a result of impregnation of the fiber cell walls with the melamine resin, so that the surface-layer-portion ligneous material 26 is subjected to the flow molding process during the above-described heating and pressing operations performed on the surface-layer-portion ligneous material 26, until the melamine resin contained in the surface-layer-portion ligneous material 26 has been completely cured. Namely, shearing forces act on the fiber cells during the heating and pressing operations on the surface-layer-portion ligneous material 26, until cross linking of the melamine resin is completed, so that the relative positions of the fiber cells are changed, and the surface-layer-portion ligneous material 26 flows along the cavity surface 54, with a result of an enlargement of the decorative design surface 18.

However, the surface-layer-portion ligneous material 26 is subjected to the above-described flow molding process while the inner circumference of the ring constituted by the four deformation preventive portions 58 is positioned at the above-indicated advanced position located radially inwardly with respect to the periphery of the opening of the recess 52. Accordingly, the surface-layer-portion ligneous material 26 flowing along the cavity surface 54 comes into contact with the inner portions of the deformation preventive portions 58, making it possible to effectively prevent ejection or extrusion of the surface-layer-portion ligneous material 26 out of the recess 52. Further, the surface-layer-portion ligneous material 26 (the sliced veneer sheet 26a and the translucency adjuster sheets 26b) is formed from the thin rectangular flat sheets sliced from the lumbers in the direction parallel to the direction of extension of the fibers, so that an amount of flow of the surface-layer-portion ligneous material 26 can be effectively reduced in the direction parallel to the direction of extension of the fibers.

Figure 8:
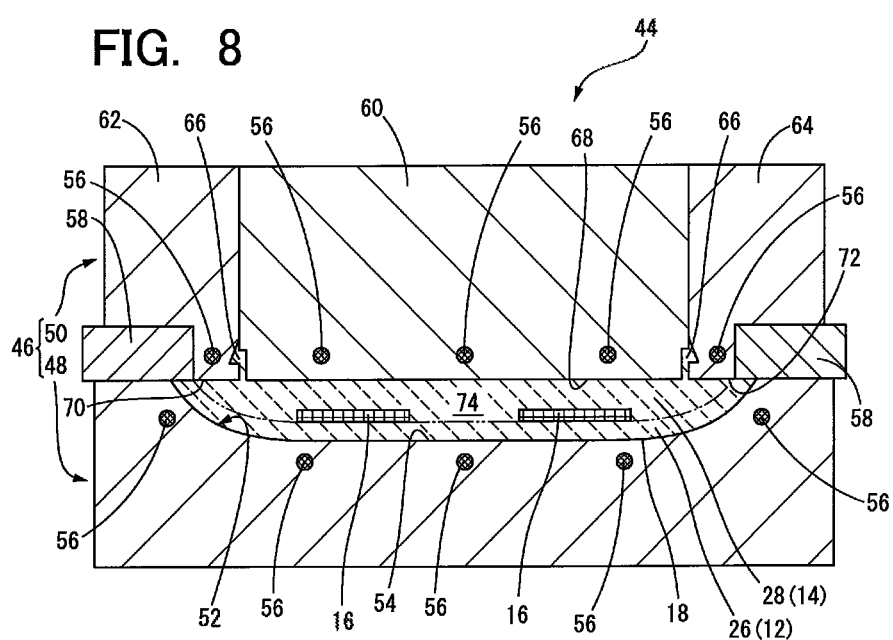
FIG. 8 is a schematic cross sectional view showing an example of a step implemented following the step shown in FIG. 7, in which the base-layer-portion ligneous material is subjected to a flow molding process by the heating and pressing device in a closed state of the forming mold, to form the ligneous decorative design part.

Subsequently, the lower die 48 is further moved upwards to a position at which the forming cavity 74 is formed between the lower die 48 and the upper die 50, as shown in FIG. 8. As a result, the base-layer-portion ligneous material 28 is principally pressed with a force of about 100 t, between the first, second and third pressure surfaces 68, 70 and 72 of the upper die 50 (the first, second and third split-die members 60, 62 and 64) and the cavity surface 54 of the lower die 48, via the surface-layer-portion ligneous material 26, in the direction of mutual superposition of those ligneous materials 26 and 28. The base-layer-portion ligneous material 28 being thus pressed is heated by the first, second and third pressure surfaces 68, 70 and 72 heated by the cartridge heaters 56, and is subjected to the flow molding process during the above-described heating and pressing operations.

That is, the heating and pressing operations are performed on the base-layer-portion ligneous material 28 which has been impregnated with the melamine resin to cut the hydrogen bonds, so that shearing forces act on the fiber cells of the base-layer-portion ligneous material 28, and the relative positions of the fiber cells are changed. As a result, the base-layer-portion ligneous material 28 (mainly, the base-layer-portion block 28*a*) flows within the forming cavity 74 formed between the upper die 50 and the lower die 48, so that the forming cavity 74 and the fixing-hook forming cavities 66 are filled with the base-layer-portion ligneous material 28. In this respect, it is noted that the base-layer-portion ligneous material 28 is generally pressed in the flow molding process, with a pressure sufficient to permit the base-layer-portion ligneous material 28 to have a specific gravity of not less than 1.3.

In the flow molding process performed with respect to the base-layer-portion ligneous material 28, an amount of flow of the base-layer-portion sheet 28*a* is advantageously reduced, since the base-layer-portion sheet 28*a* is the thin rectangular flat sheet which has the outer profile almost equal to that of the surface-layer-portion ligneous material 26 (the sliced veneer sheet 26*a*) and which is cut from the lumber in the direction parallel to the direction of extension of the fibers.

On the other hand, the base-layer-portion block 28*b* is subjected to the flow molding process without limitation of flow of the base-layer-portion block 28*b* by the deformation preventive portions 58. Further, the base-layer-portion block 28*b* is the rectangular block cut from the lumber in the direction perpendicular to the direction of extension of the fibers, so that the base-layer-portion block 28*b* flows in the direction perpendicular to the direction of extension of the fibers. In the present embodiment, therefore, the base-layer-portion block 28*b* can flow smoothly and by a large amount. Namely, the base-layer-portion block 28*b* more freely flows within the forming cavity 74 in the flow molding process, so that the amount of flow of the base-layer-portion block 28*b* in the flow molding process is made sufficiently larger than the amounts of flow of the surface-layer-portion ligneous material 26 and the base-layer-portion sheet 28*a* in the flow molding process.

The base-layer-portion ligneous material 28 (the base-layer-portion block 28*b*) filling the forming cavity 74 and the fixing-hook forming cavities 66 is kept subjected to the pressing force, so that the base-layer-portion ligneous material 28 is compacted. The thus compacted base-layer-portion ligneous material 28 is heated by the first, second, and third pressure surfaces 68, 70 and 72 and the cavity surface 54, to the curing point of the melamine resin. In this respect, it is noted that the base-layer-portion ligneous material 28 and the surface-layer-portion ligneous material 26 are kept pressed by the upper die 50 and the lower die 48, for about five minutes, for example.

Thus, the base-layer-portion ligneous material 28 is given (formed to have) a permanent shape corresponding to a portion of the forming cavity 74 other than the portion in which the surface layer portion 12 is formed, whereby the base layer portion 14 is eventually formed. At the same time, the fixing hooks 22 are formed integrally with the base layer portion 14 such that the fixing hooks 22 extend from the back surface of the base layer portion 14. Further, the surface layer portion 12 and the base layer portion 14 are integrated with each other in the forming cavity 74, such that the plant leaves 16 are fixed at predetermined positions between the surface layer portion 12 and the base layer portion 14, whereby the interior part 10 in the form of a one-piece body consisting of the surface layer portion 12, the base layer portion 14 and the plant leaves 16 is obtained. It is considered that the surface layer portion 12 and the base layer portion 14 are integrated with each other, owing to bonding of the melamine resin contained in the surface layer portion 12 (the surface-layer-portion ligneous material 26) and the melamine resin contained in the base layer portion 14 (the base-layer-portion ligneous material 28) to each other, or in the presence of lignin existing among the fiber cells of the surface layer portion 12 (the surface-layer-portion ligneous material 26) and the base layer portion 14 (the base-layer-portion ligneous material 28).

Then, the upper die 50 and the lower die 48 are spaced apart from each other, and the one-piece body consisting of the surface layer portion 12, the base layer portion 14 and the plant leaves 16 sandwiched therebetween is removed from the upper die 50 and the lower die 48. Thus, the interior part 10 having the structure shown in FIG. 1 is produced.

It will be understood from the foregoing description of the interior part 10 according to the present embodiment that the surface layer portion 12 is a laminar body consisting of the sliced veneer 12*a* and the translucency adjustor layer 12*b* which is formed of the ligneous material (the translucency adjustor sheets 26*b*) impregnated with the resin material, and which is integrally formed on the back surface of the sliced veneer 12*a*, so that the translucency of the surface layer portion 12 can be adjusted by suitably determining the translucency of the translucency adjustor layer 12*b*, without a need for changing the material and thickness of the sliced veneer 12*a*, whereby the surface layer portion 12 can be given a desired appearance of wood owing to the sliced veneer 12*a*.

It is noted that the translucency adjustor layer 12*b* provided to adjust the translucency of the surface layer portion 12 is formed from the lumber (agathis or the like) which is less costly than the material of the sliced veneer 12*a*, so that the surface layer portion 12 can be given a desired degree of translucency, without a need for changing (increasing) the thickness of the sliced veneer 12*a*, whereby the cost of the materials can be advantageously reduced.

Further, the base layer portion 14 formed of the ligneous material (the base-layer-portion sheet 28*a* and the base-layer-portion block 28*b*) impregnated with the resin material has translucency, and the surface layer portion 12 is given the desired degree of translucency in the presence of the translucency adjustor layer 12*b*, so that the plant leaves 16 can be made selectively visible and invisible on the side of the front surface (the decorative design surface 18) of the surface layer portion 12, depending upon whether the light source 38 disposed on the back side of the base layer portion 14 is placed in the on or off state. Thus, the interior part 10 can be given a novel design with a high degree of originality.

In addition, the plant leaves 16 are interposed between the surface layer portion 12 and the base layer portion 14, and are thus insulated from the external environment, to effectively prevent aging or rotting of the plant leaves 16. Further, the plant leaves 16 are visible through the translucent surface layer portion 12, so that the interior part 10 as a whole can be advantageously given a third-dimension appearance.

Further, the surface layer portion 12 and the base layer portion 14 are formed as a result of curing of the melamine resin with which the fiber cells are impregnated. Therefore, the interior part 10 is advantageously given higher degrees of scratch-, water- and weather-proof properties, without a need for coating the interior part 10 with a coating layer formed of a transparent resin. In addition, the interior part 10 is advantageously protected from its geometrical deformation due to its soaking with an aqueous component. Further, in the absence of any coating layer of a resin material, the interior part 10 is effectively given a genuine lumber appearance and feel. Furthermore, the interior part 10 using the melamine resin in an amount as small as possible does not cause deterioration of preservation of resources and environments.

In the method of producing the interior part 10 according to the present embodiment, the translucency adjustor sheets 26b and the base-layer-portion sheet 28a have the outer profiles almost equal to that of the sliced veneer 12a (the sliced veneer sheet 26a), so that the amounts of flow of the translucency adjustor sheets 26b and the base-layer-portion sheet 28a in the flow molding process can be effectively reduced. Further, the base-layer-portion ligneous material 28 is subjected to the flow molding process, with the plant leaves 16 being interposed between the translucency adjustor sheet 26b and the base-layer-portion sheet 28b and accommodated in the forming cavity 74, so that the plant leaves 16 can be effectively prevented from being moved or destructed in the flow molding process. Accordingly, the plant leaves 16 can be disposed at desired positions and in a desired pattern of arrangement, giving the interior part 10 a desired decorative design or appearance.

In addition, the surface layer portion 12 is formed by curing the melamine resin contained in the surface-layer-portion ligneous material 26 accommodated in the forming cavity 74, and the base-layer-portion ligneous material 28 is subjected to the flow molding process in the forming cavity 74, so that the amount of flow of the surface-layer-portion ligneous material 26 (the sliced veneer sheet 26a and the translucency adjustor sheets 26b) in the flow molding process can be effectively reduced, making it possible to effectively prevent an excessively large amount of flow of the surface-layer-portion ligneous material 26 during formation of the base layer portion 14 by the flow molding process, movements or breakage of the plant leaves 16 placed on the surface-layer-portion ligneous material 26 (on the upper translucency adjustor sheet 26b), collapsing of the woody grain 20, and destruction of the sliced veneer sheet 26a. In the present embodiment, the advantages described above can be obtained with a high degree of stability, owing to the heating of the cavity surface 54 to the temperature higher than that of the pressure surfaces 68, 70 and 72. However, it is not essential to heat the cavity surface 54 and the pressure surfaces 68, 70 and 72 to the different temperatures.

The present embodiment is further configured to prevent deformation of the surface-layer-portion ligneous material 26 subjected to the flow molding process, to such an extent that causes an enlargement of the surface area of the decorative design surface 18 of the eventually produced interior part 10 with respect to the intended value. Therefore, it is possible to effectively prevent the woody grain 20 on the surface of the surface-layer-portion ligneous material 26, which surface gives the decorative design surface 18 of the desired interior part 10, from being deformed or collapsed by enlargement of the surface area of the above-described surface of the surface-layer-portion ligneous material 26. Accordingly, the present interior part 10 can be given the decorative design surface 18 having the natural and fine woody grain 20, and can advantageously exhibit significantly enhanced aesthetic dignity and highly refined ligneous properties.

It is also noted that the translucency adjustor layer 12b is constituted by the plurality of translucency adjustor sheets 26b which are superposed on each other and which are impregnated with the resin material, so that the translucency of the translucency adjustor layer 12b and the translucency of the surface layer portion 12 as a whole can be easily adjusted by suitably selecting the material, the thickness and the number of the translucency adjuster sheets 26b superposed on each other. Further, the base layer portion 14 is formed by using the laminar body consisting of the plurality of ligneous materials (the base-layer-portion sheet 28a and the base-layer-portion block 28b) which are superposed on each other and which are impregnated with the resin material, so that the base layer portion 14 advantageously has translucency which can be adjusted as needed, by suitably selecting the material and the thickness of the base-layer-portion ligneous material 28, and the number of sheet(s) and/or block(s) of the base-layer-portion ligneous material 28 superposed on each other.

Further, the base layer portion 14 is formed by using the laminar body consisting of the base-layer-portion sheet 28a having a comparatively low degree of fluidity and a comparatively small amount of flow in the flow molding process, and the base-layer-portion block 28b having a comparatively high degree of fluidity and a comparatively large amount of flow in the flow molding process. Accordingly, movements and breakage of the plant leaves 16 can be effectively prevented, and the required flow molding pressure can be reduced.

In the present embodiment, the sliced veneer sheet 26a sliced from the costly bird's-eye maple is used as the material of the decorative design surface 18 of the surface layer portion 12, while the translucency adjustor sheets 26b, the base-layer-portion sheet 28a and the base-layer-portion block 28b, which are sliced or cut from the agathis lumber that is less costly than the bird's-eye maple, are used as the materials of the other part (the translucency adjustor layer 12b) of the surface layer portion 12 and the base layer portion 14. Accordingly, it is possible to effectively reduce the overall material cost of the interior part 10, while ensuring a high-grade appearance of the decorative design surface 18.

By the way, the interior part 10 having the structure shown in FIG. 1 may be produced by an alternative method different from the method described above. This alternative method will be described.

Figure 9:
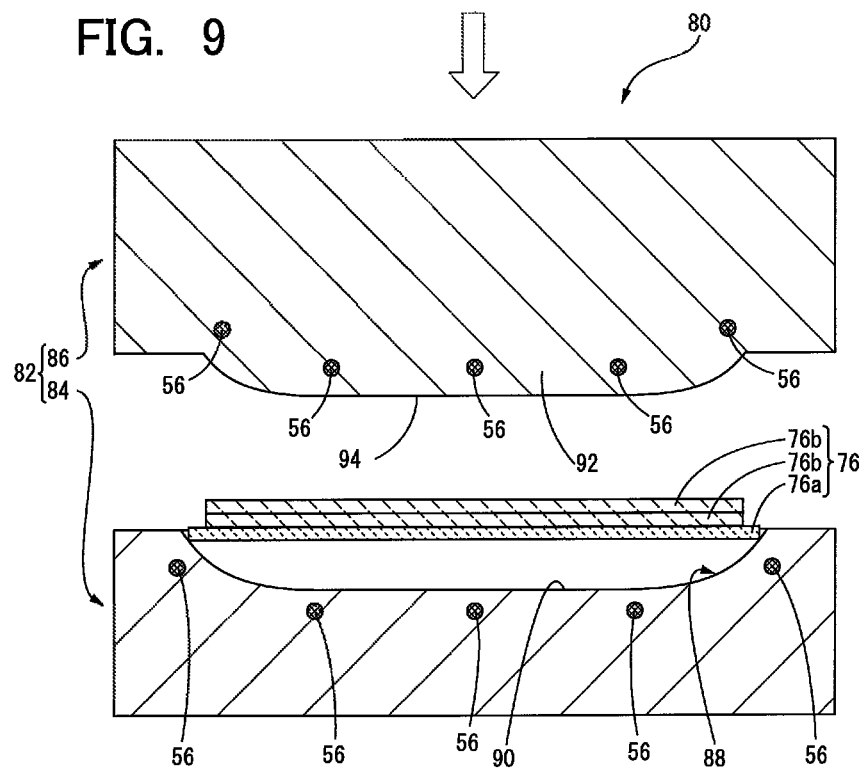
FIG. 9 is a schematic cross sectional view showing an example of a step of a method of producing the ligneous decorative design part of FIG. 1 in another embodiment of this invention, in which the surface-layer-portion ligneous material is set in a surface-layer-portion forming mold of a surface-layer-portion forming heating and pressing device.

Initially, a sliced veneer sheet 76a and translucency adjustor sheets 76b having the same structures as the sliced veneer sheet 26a and translucency adjustor sheets 26b in the preceding embodiment are provided as a surface-layer-portion ligneous material 76, as shown in FIG. 9.

Figure 11:
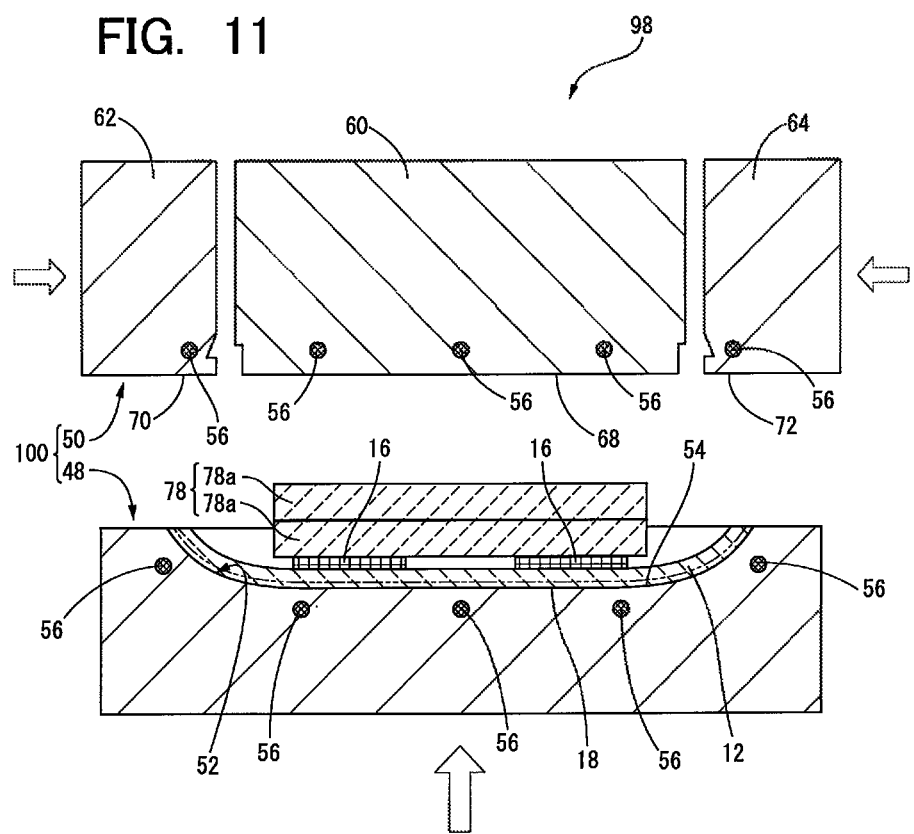
FIG. 11 is a schematic cross sectional view showing an example of a step implemented following the step shown in FIG. 10, in which a base-layer-portion ligneous material and the surface layer portion formed by the surface-layer-portion forming heating and pressing device are set in a forming mold of a heating and pressing device such that another material is disposed between the base-layer-portion ligneous material and the surface layer portion.

On the other hand, a plurality of (two in this example) base-layer-portion sheets 78a in the form of relatively thick elongate rectangular flat sheets sliced from an agathis lumber in a direction perpendicular to the direction of extension of the fibers of the lumber are provided as a base-layer-portion ligneous material 78, as shown in FIG. 11. Each of these base-layer-portion sheets 78a has a thickness larger than those of the sliced veneer sheet 76a and the translucency adjustor sheets 76b of the surface-layer-portion ligneous material 76, and has an outer profile smaller than those of the sliced veneer sheet 76a and the translucency adjustor sheets 76b.

Then, the fiber cell walls of the ligneous materials (the sliced veneer sheet 76a, the translucency adjustor sheets 76b, and the base-layer-portion sheets 78a) are impregnated with an aqueous solution of a melamine resin. This step of impregnating the ligneous materials is the same as in the method in the preceding embodiment. Namely, the ligneous materials 76*a*, 76*b* and 78*a* are immersed in the aqueous melamine resin solution in a bath disposed within a pressure vessel, and the pressure within the pressure vessel is alternately reduced and raised to the same pressure values as in the impregnating step described above with respect to the preceding embodiment.

Then, the ligneous materials 76*a*, 76*b* and 78*a* which have been impregnated with the aqueous melamine resin solution are taken out of the pressure vessel, and are dried. Thus, the sliced veneer sheet 76*a* and the translucency adjustor sheets 76*b* impregnated with the resin material are provided as the surface-layer-portion ligneous material 76, while the base-layer-portion sheets 78*a* impregnated with the resin material are provided as the base-layer-portion ligneous material 78.

Subsequently, the surface-layer-portion ligneous material 76 is subjected to heating and pressing operations by using a surface-layer-portion-forming heating and pressing device 80 shown in FIGS. 9 and 10, to form the surface layer portion 12.

Namely, the surface-layer-portion-forming heating and pressing device 80 has a surface-layer-portion forming mold 82, which includes a lower die 84 fixed in position, and an upper die 86 which is disposed above and in opposition to the lower die 84 with a predetermined distance therebetween, as shown in FIG. 9.

The lower die 84 of the surface-layer-portion forming mold 82 has a cavity forming recess 88 open upwards. This cavity forming recess 88 has an inner surface of a generally elongate rectangular shape, which serves as a downwardly curved lower-die cavity surface 90 which corresponds to the decorative design surface 18 of the surface layer portion 12 (the interior part 10). Further, the lower die 84 has a plurality of cartridge heaters 56 embedded therein in the vicinity of the lower-die cavity surface 90. These cartridge heaters 56 are controlled of their heating temperature by a controller not shown, so that the lower-die cavity surface 90 is heated to a predetermined temperature by the cartridge heaters 56 under the control of the controller.

On the other hand, the upper die 86 is movable in the vertical direction by a predetermined distance by a moving device (not shown) which includes a hydraulic cylinder or the like and which has a structure known in the art. Further, the upper die 86 has an integrally formed cavity forming protrusion 92 protruding downwards from its lower surface, and this cavity forming protrusion 92 has an upper-die cavity surface 94 in the form of a downwardly curved surface corresponding to the back surface of the surface layer portion 12 (opposite to the decorative design surface 18), that is, corresponding to the surface of the surface layer portion 12 bonded to the base layer portion 14.

The upper die 86 has a plurality of cartridge heaters 56 embedded therein in the vicinity of the upper-die cavity surface 94. Like the plurality of cartridge heaters 56 embedded in the lower die 84, the cartridge heaters 56 embedded in the upper die 86 are controlled of their heating temperature by the controller not shown, so that the upper-die cavity surface 94 is heated to a predetermined temperature by the cartridge heaters 56 under the control of the controller.

To form the surface layer portion 12 by using the surface-layer-portion-forming heating and pressing device 80 having the surface-layer-portion forming mold 82 constructed as described above, the surface-layer-portion ligneous material 76 is initially accommodated in the cavity forming recess 88 of the lower die 84 while the surface-layer-portion forming mold 82 consisting of the lower die 84 and the upper die 86 is held in its open state, as shown in FIG. 9. At this time, the surface-layer-portion ligneous material 76 is accommodated in the cavity forming recess 88 such that the periphery of the sliced veneer sheet 76*a* is held in engagement with the peripheral portion of the lower-die cavity surface 90 in the vicinity of the opening of the cavity forming recess 88, so that the opening of the cavity forming recess 88 is covered by the sliced veneer sheet 76*a*, and such that the translucency adjuster sheets 76*b* are superposed on the sliced veneer sheet 76*a*.

While or before the surface-layer-portion ligneous material 76 is accommodated in the cavity forming recess 88, the lower-die cavity surface 90 of the lower die 84 and the upper-die cavity surface 94 of the upper die 86 are heated by the plurality of cartridge heaters 56 embedded in the lower die 84 and the upper die 86, to a temperature lower than the curing point of the melamine resin contained in the aqueous melamine resin solution with which the surface-layer-portion ligneous material 76 has been impregnated. The lower-die cavity surface 90 and the upper-die cavity surface 94 are then kept at this temperature. Accordingly, the surface-layer-portion ligneous material 76 accommodated in the cavity forming recess 88 is heated by the heated lower-die cavity surface 90, so that the surface-layer-portion ligneous material 76 is softened as a whole. In the present embodiment, the lower-die cavity surface 90 and the upper-die cavity surface 94 are heated to a temperature of about 150° C., or a temperature slightly lower than 150° C.

Figure 10:
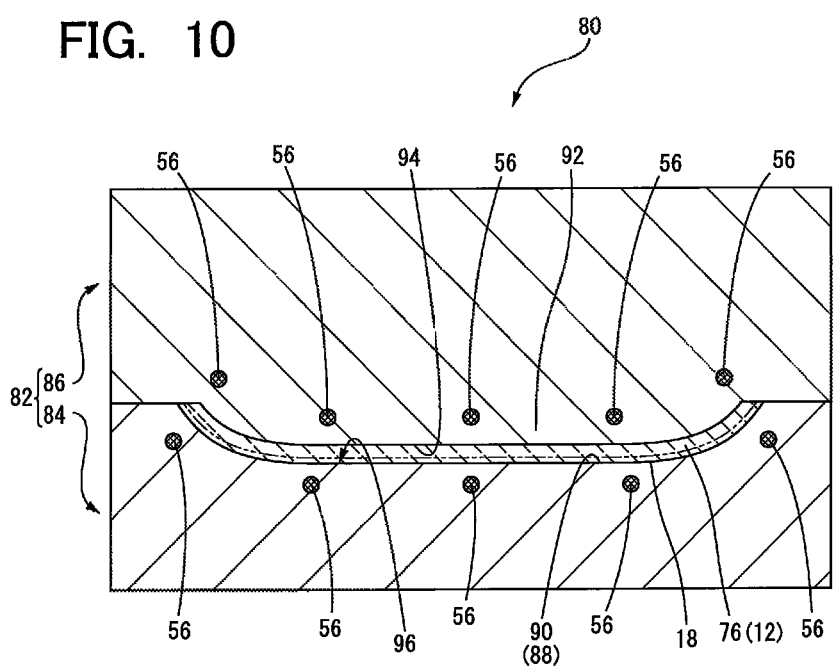
FIG. 10 is a schematic cross sectional view showing an example of a step implemented following the step shown in FIG. 9, in which a surface layer portion is formed by the surface-layer-portion forming heating and pressing device in a closed state of the surface-layer-portion forming mold.

Then, the upper die 86 is moved downwards until the cavity forming protrusion 92 is fitted in the cavity forming recess 88 of the lower die 84, as shown in FIG. 10, so that the forming cavity 96 thus formed between the lower die 84 and the upper die 86 is filled with the surface-layer-portion ligneous material 76 accommodated in the cavity forming recess 88. As a result, the surface-layer-portion ligneous material 76 is subjected to heating and pressing operations, so that the surface-layer-portion ligneous material 76 is given the shape corresponding to that of the forming cavity 96. Then, the surface-layer-portion ligneous material 76 is heated by the lower-die cavity surface 90 and the upper-die cavity surface 94 to the curing point (e.g., about 150° C.) of the melamine resin, so that the melamine resin contained in the surface-layer-portion ligneous material 76 is cured to permit the surface-layer-portion ligneous material 76 to maintain the shape corresponding to that of the forming cavity 96, whereby the surface layer portion 12 is formed such that the surface of the surface layer portion 12 on the side of the lower-die cavity surface 90 serves as the decorative design surface 18.

Successively, the intended interior part 10 is produced by using the surface layer portion 12 formed as described above, the base-layer-portion ligneous material 78 (the base-layer-portion sheets 78*a*), and the plant leaves 16, and a heating and pressing device 98 shown in FIG. 11, which is substantially identical in construction with the heating and pressing device 44 described above with respect to the preceding embodiment. A forming mold 100 provided in the heating and pressing device 98 is identical in construction with the forming mold 46 provided in the heating and pressing device 44, except for elimination of the plurality of deformation preventive portions 58 and the moving mechanism for moving the deformation preventive portions 58. Therefore, the same reference signs as used in FIGS. 5-8 will be used in FIGS. 11-13, to identify the elements and portions of the forming mold 100 of the heating and pressing device 98 which are identical with the corresponding elements and portions of the forming mold 46 of the heating and pressing device 44. Those elements and portions of the forming mold 100 will not be described redundantly.

To produce the interior part 10 by using the heating and pressing device 98, the surface layer portion 12, the base-layer-portion ligneous material 78 (the base-layer-portion sheets 78*a*), and the plant leaves 16 are accommodated in the recess 52 of the lower die 48 while the forming mold 100 is placed in its open state with the upper die 50 and the lower die 48 being spaced apart from each other, as shown in FIG. 11.

At this time, the surface layer portion 12 is disposed such that the entirety of the decorative design surface 18 is held in contact with the cavity surface 54 of the recess 52, while the plant leaves 16 are placed at the predetermined positions on the surface layer portion 12, and the base-layer-portion sheets 78*a* in the form of relatively thick flat sheets superposed on each other in the direction of their thicknesses are superposed on the surface layer portion 12.

While or before the surface layer portion 12, the plant leaves 16 and the base-layer-portion ligneous material 78 are accommodated in the recess 52, the cavity surface 54 of the lower die 48, and the first, second and third pressure surfaces 68, 70 and 72 of the first, second and third split-die members 60, 62 and 64 of the upper die 50 are heated to and kept at the curing point of the melamine resin, by the plurality of cartridge heaters 56 embedded in the lower die 48 and the upper die 50. Described more specifically, the cavity surface 54 and the first, second and third pressure surfaces 68, 70 and 72 are heated to and kept at a temperature of about 150° C.

Figure 12:
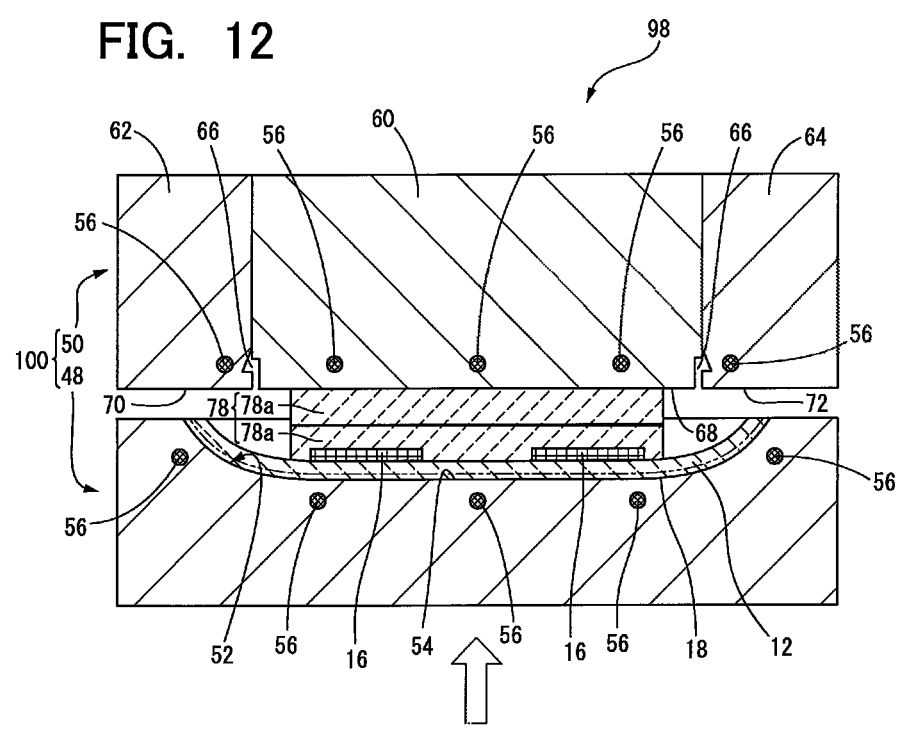
FIG. 12 is a schematic cross sectional view showing an example of a step implemented following the step shown in FIG. 11, in which an upper die of the forming mold comes into contact with an upper surface of the base-layer-portion ligneous material, in a process of a closing action of the forming mold.

Then, the lower die 48 is moved upwards until the upper surface of the upper one of the two mutually superposed base-layer-portion sheets 78*a* constituting the base-layer-portion ligneous material 78 and placed on the surface layer portion 12 is brought into contact with the first, second and third pressure surfaces 68, 70 and 72 of the first, second and third split-die members 60, 62 and 64, as shown in FIG. 12, and the lower die 48 is moved upwards by a further distance so that the base-layer-portion ligneous material 78 is pressed by the first, second and third pressure surfaces 68, 70 and 72 in the direction of mutual superposition of the surface layer portion 12 and the base-layer-portion ligneous material 78. At this time, the plant leaves 16 are pressed such that their upper surfaces are entirely covered by the lower surface of the base-layer-portion ligneous material 78 (by the lower surface of the lower one of the two base-layer-portion sheets 78*a*). In this state of pressing of the base-layer-portion ligneous material 78, the ligneous material 78 is heated by the first, second and third pressure surfaces 68, 70 and 72 and the cavity surface 54 of the lower die 48 which are heated by the cartridge heaters 56. Thus, the base-layer-portion ligneous material 78 is subjected to the flow molding process during the heating and pressing operations performed as described above.

Namely, the base-layer-portion ligneous material 78 impregnated with the aqueous melamine resin solution to cut the hydrogen bonds is subjected to the heating and pressing operations so that shearing forces act on the fiber cells of the base-layer-portion ligneous material 78 during the heating and pressing operations, with a result of a change of the relative positions of the fiber cells. Thus, the base-layer-portion ligneous material 78 is subjected to the flow molding process, to cause its flow within the forming cavity 74 formed between the upper die 50 and the lower die 48.

Regarding the pressing operation performed on the base-layer-portion sheets 78*a* constituting the base-layer-portion ligneous material 78, it is noted that each base-layer-portion sheet 78*a* is the relatively thick flat sheet sliced from the lumber in the direction perpendicular to the direction of extension of the fibers of the lumber, and is pressed in the direction of extension of the fibers. Accordingly, the relative positions of the fiber cells of the base-layer-portion ligneous material 78 as a whole can be more smoothly and rapidly changed as a result of the heating and pressing operations performed thereon.

During the flow molding process of the base-layer-portion ligneous material 78, the surface layer portion 12 on which the base-layer-portion ligneous material 78 is placed and which is accommodated in the forming cavity 74 is also subjected to the heating and pressing operations, like the base-layer-portion ligneous material 78. However, since the melamine resin that is a thermosetting resin with which the surface layer portion 12 is impregnated has already been cured, a flow molding process of the surface layer portion 12 does not take place during the heating and pressing operations within the forming cavity 74.

The base-layer-portion ligneous material 78 filling the forming cavity 74 and the fixing-hook forming cavities 66 is kept pressed or compacted by and between the lower die 48 and the upper die 50, for a predetermined length of time. The thus compacted base-layer-portion ligneous material 78 is heated by the first, second and third pressure surfaces 68, 70 and 72 and the cavity surface 54, to the curing point of the melamine resin.

Thus, the base-layer-portion ligneous material 78 is given (formed to have) a permanent shape corresponding to a portion of the forming cavity 74 other than the portion in which the surface layer portion 12 is accommodated, whereby the base layer portion 14 is eventually formed. At the same time, the fixing hooks 22 are formed integrally with the base layer portion 14 such that the fixing hooks 22 extend from the back surface of the base layer portion 14. Further, the surface layer portion 12 and the base layer portion 14 are integrated into a one-piece body in the forming cavity 74.

Then, the lower die 48 is moved downwards apart from the upper die 50, and the surface layer portion 12 and the base layer portion 14 which are formed integrally with each other and between which the plant leaves 16 are interposed are removed from the lower and upper dies 48 and 50, whereby the interior part 10 having the structure shown in FIG. 1 is eventually obtained.

It will be understood from the foregoing description that the method according to the present embodiment permits advantageous production of the interior part 10 having the excellent properties described above.

In particular, the present method uses the surface-layer-portion-forming heating and pressing device 80 to first form the surface layer portion 12, and includes the step of implementing the flow molding process with respect to the base-layer-portion ligneous material 78 within the forming cavity 74 of the heating and pressing device 98. Accordingly, the method prevents deformation of the surface layer portion 12 (the sliced veneer 12*a* and the translucency adjustor layer 12*b*) during the flow molding process implemented with respect to the base-layer-portion ligneous material 78 (the base-layer-portion sheets 78*a*). Thus, it is possible to stably prevent movements and breakage of the plant leaves 16 placed on the surface layer portion 12 (the translucency adjustor layer 12*b*). It is also possible to stably prevent deformation and collapsing of the woody grain 20 formed on the decorative design surface 18 of the surface layer portion 12, which would take place due to the heating and pressing operations within the forming cavity 74.

In the present embodiment, the base-layer-portion ligneous material 78 as a whole has a high degree of fluidity, but the base-layer-portion ligneous material 78 (the lower base-layer-portion sheet 78*a*, in particular) has an outer profile large enough to cover the entirety of the plant leaves 16, so that the plant leaves 16 are pressed at the predetermined positions onto the lower surface of the base-layer-portion ligneous material 78 (the lower base-layer-portion sheet 78*a*) which is opposed to the surface layer portion 12. Accordingly, the movements and breakage of the plant leaves 16 due to the flow of the base-layer-portion ligneous material 78 can be effectively prevented.

While the embodiments of this invention have been described above for illustrative purpose only, it is to be understood that the invention is not limited to the details of the illustrated embodiments.

For instance, the translucency adjustor layer 12*b* is not essential in the ligneous decorative design part (the interior part 10). Namely, the surface layer portion 12 may be constituted by only the sliced veneer 12*a*. Accordingly, it is not essential to determine the translucency of the surface layer portion 12 such that the plant leaves 16 is visible or invisible depending upon whether a light is incident upon the interior part 10 on its back side, or not. That is, the plant leaves 16 may be made always visible on the front side of the interior part 10 (on the side of the decorative design surface 18). In this case, too, the interior part 10 exhibits a novel handsome design (appearance) owing to the woody appearance of the sliced veneer 12*a* and the visibility of the plant leaves 16.

It is noted that the material which is to be interposed between the surface layer portion 12 and the base layer portion 14 and which is different from the surface-layer-portion and base-layer-portion ligneous materials 26, 28, 76, 78 is not limited to the plant leaves 16 used in the illustrated embodiments. Namely, this different material may be any material the translucency of which or the wavelength of a light transmitted through or reflected by which is different from that of the surface layer portion 12, and which is visible on the side of the front surface of the surface layer portion 12. For instance, the different material may be a natural material or substance such as a portion of trees or any other plants, and a part of insects or any other animals, or an artificial material or substance such as pieces of glasses or metals, or resins formed into desired shapes. However, it is preferable to use, as the different material, the natural material or substance such as the plants and insects, as well as the plant leaves 16 used in the illustrated embodiments, from the standpoint of affinity with the ligneous material (the sliced veneer 12*a*), so that the interior part 10 can exhibit a considerably high degree of excellence in design, together with a woody texture or appearance of the ligneous material.

Further, it is not essential that the base layer portion 14 has translucency. Where the light source (38) is not provided: on the side of the back surface of the interior part 10 installed on an automotive vehicle (fixed to the vehicle part 30), and the plant leaves 16 are always visible on the side of the front surface (the decorative design surface 18) of the interior part 10, for example, the base layer portion 14 need not have translucency.

Further, the base layer portion 14 may be partially or entirely formed by a process other than the flow molding process implemented with respect to the ligneous material impregnated with the resin material. For instance, the base layer portion 14 may be partially or entirely formed by an injection molding process using a thermoplastic resin. In this case, it is preferable that pieces of glasses or metals or any other materials or substances having a strength (rigidity) high enough to prevent their breakage by an injecting pressure acting on the thermplastic resin are used as the different material to be interposed between the surface layer portion 12 and the base layer portion 14. It is also preferable that the different material is fixed in position on the back surface of the surface layer portion 12 by bonding or any other method, to prevent movements of the different material due to flows of the resin.

The resin material with which the ligneous materials are impregnated may be any known resin material such as a phenolic resin, other than the melamine resin used in the illustrated embodiments. According to the present invention, it is preferable to use a resin material which is transparent or which has a sufficiently high degree of translucency and can be considered substantially transparent. A resin having a light or pale color, for instance, the melamine resin having a milky-white color, is more preferably used, so that the sliced veneer (12*a*) can effectively exhibit the woody appearance or the woody grain (20). In order to achieve a high degree of originality in design, the resin material with which the ligneous materials are impregnated may be a colored resin, or may contain a dye or pigment.

In the illustrated embodiments, the fiber cell walls of the surface-layer-portion ligneous material 26, 76 and the base-layer-layer portion ligneous material 28, 78 are impregnated with the same kind of thermosetting resin in the form of the melamine resin. However, the resin material used for the surface-layer-portion ligneous material 26, 76 and the resin material used for the base-layer-portion ligneous material 28, 78 may be different in kind from each other.

Further, the resin material with which the surface-layer-portion ligneous material 26, 76 and the base-layer-portion ligneous material 28, 78 are impregnated may be a thermoplastic resin in the form of a thermoplastic acrylic resin (such as a polymer of an acrylic monomer such as methyl acrylate and methyl methacrylate). In this case, however, a treatment such as a known treatment to acetylate the cellulose of the fiber cells of the surface-layer-portion ligneous material 26, 76 and the base-layer-portion ligneous material 28, 78 may be required to be performed to cut the hydrogen bonds among the fiber cells of those ligneous materials 26, 28, 76, 78, before those ligneous materials 26, 28, 76, 78 are impregnated with the thermoplastic resin.

The ligneous materials may be impregnated with a resin material, by any known method. For instance, the ligneous materials are immersed in an aqueous solution of the resin material, or coated with the aqueous solution of the resin material, so that the ligneous materials are impregnated with the resin material. Alternatively, the ligneous materials are coated with the aqueous solution of the resin material, by using a sponge-roll coater, a natural reverse coater or a flow coater.

Further, a part of the base-layer-portion ligneous material 28, 78, in particular, a part such as the base-layer-portion sheet 28*a* or the lower base-layer-portion sheet 78*a* in the illustrated embodiments, which is brought into contact with the plant leaves 16 (the another or different material), may be suitably shaped in advance of the flow molding process, in order to reduce an amount of flow of the above-indicated part of the ligneous material 28, 78, for more effectively preventing the movements or breakage of the different material.

The directions (with respect to the direction of extension of the fibers of the lumbers) in which the surface-layer-portion ligneous material 26, 76 and the base-layer-portion ligneous material 28, 78 are sliced or cut from the lumbers are not limited to those in the illustrated embodiments. For example, the ligneous materials 26, 28, 76, 78 may be sliced or cut from the lumbers in different directions suitably selected to control the amounts of flow of the ligneous materials 26, 28, 76, 78 in the flow molding process, for effectively preventing the movements or breakage of the plant leaves 16 (the another or different material), and collapsing of the woody grain 20 on the decorative design surface 18.

Further, the surface-layer-portion ligneous material 26, 76 and the base-layer-portion ligneous material 28, 78 may be subjected to a bleaching or coloring treatment for giving them desired degrees of translucency or desired appearances.

It is also noted that bamboos may be used as the surface-layer-portion and base-layer-portion ligneous materials, in place of lumbers or timbers.

Further, the form of the base-layer-portion ligneous material is not limited to the flat sheet and the block employed in the illustrated embodiments. For instance, the base-layer-portion ligneous material may take the form of chips or pieces of lumber or bamboo obtained by breaking, chopping or cutting. Irrespective of any specific form of the base-layer-portion ligneous material, the fiber cell walls of the ligneous material are required to be impregnated with a resin material.

Although the fiber cells of the surface-layer-portion ligneous material 26, 76 are required to be impregnated with a resin material according to the present invention, the resin material need not be contained in the fiber cell walls. For instance, the resin material may be merely accommodated in internal pores of the fiber cells. This method may be adopted where the surface layer portion 12 is initially formed of the surface-layer-portion ligneous material 76, and the base-layer-portion ligneous material 78 is then subjected to the flow molding process within the forming cavity 74 in which the surface layer portion 12 and the base-layer-portion ligneous material 78 are accommodated.

It will be understood that the principle of the present invention is suitably applicable to a ligneous decorative design part other than the interior part of the automotive vehicle, and a method of producing the same.

It is to be understood that the present invention may be embodied with various changes, modifications and improvements which are not described herein, and which may occur to those skilled in the art, without departing from the spirit and scope of this invention.

The invention claimed is:

1. A ligneous decorative design part comprising:
a translucent surface layer portion including a ligneous sliced veneer impregnated with a resin material and disposed on a side of a front surface of the translucent surface layer portion, and which defines a decorative design surface of the ligneous decorative design part;
a base layer portion superposed on a back surface of said translucent surface layer portion, and formed integrally with said translucent surface layer portion; and
another material, selected from the group consisting of plant leaves and insects, interposed between said translucent surface layer portion and said base layer portion,
wherein said another material is visible on the side of the front surface of said translucent surface layer portion,
wherein said translucent surface layer portion is a laminar body consisting of said sliced veneer and a translucency adjustor layer made of a ligneous material impregnated with a resin material, and integrally formed on a back surface of said sliced veneer,
wherein said base layer portion is translucent and is made of a ligneous material impregnated with a resin material, and
wherein the translucency of said surface layer portion is adjusted by said translucency adjustor layer such that said another material is not visible on the side of the front surface of said surface layer portion when the ligneous decorative design part is not exposed to a light generated by a light source disposed on a side of a back surface of said base layer portion, and is visible on the side of the front surface of said translucent surface layer portion when the ligneous decorative design part is exposed to the light generated by said light source.

2. The ligneous decorative design part according to claim 1, wherein a translucency of said another material is different from the translucency of said translucent surface layer portion, or a wavelength of light transmitted through or reflected by said another material is different from a wavelength of light transmitted through or reflected by said translucent surface layer portion.

3. The ligneous decorative design part according to claim 1, wherein said sliced veneer is impregnated with a melamine resin.

4. An automotive vehicle interior part consisting of the ligneous decorative design part according to claim 1, and which is configured to be installed in a compartment of an automotive vehicle such that said decorative design surface of said surface layer portion is exposed to the inside of the compartment of the automotive vehicle.

* * * * *